United States Patent
Said et al.

(10) Patent No.: US 10,863,199 B2
(45) Date of Patent: Dec. 8, 2020

(54) MINIMIZATION OF TRANSFORM MEMORY AND LATENCY VIA PARALLEL FACTORIZATIONS

(71) Applicant: QUALCOMM Incorporated, San Diego, CA (US)

(72) Inventors: Amir Said, San Diego, CA (US); Hilmi Enes Egilmez, San Diego, CA (US); Marta Karczewicz, San Diego, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/364,007

(22) Filed: Mar. 25, 2019

(65) Prior Publication Data

US 2019/0297351 A1    Sep. 26, 2019

Related U.S. Application Data

(60) Provisional application No. 62/648,321, filed on Mar. 26, 2018.

(51) Int. Cl.
*H04N 19/61* (2014.01)
*H04N 19/52* (2014.01)
(Continued)

(52) U.S. Cl.
CPC .......... *H04N 19/61* (2014.11); *H04N 19/139* (2014.11); *H04N 19/176* (2014.11);
(Continued)

(58) Field of Classification Search
CPC ...... H04N 19/61; H04N 19/439; H04N 19/52; H04N 19/176; H04N 19/70; H04N 19/436; H04N 19/139; H04N 19/105
See application file for complete search history.

(56) References Cited

U.S. PATENT DOCUMENTS

| 2009/0002379 A1* | 1/2009 | Baeza | ........................ G06T 1/20 |
| | | | 345/522 |
| 2012/0177108 A1* | 7/2012 | Joshi | ..................... G06F 17/147 |
| | | | 375/240.03 |

(Continued)

FOREIGN PATENT DOCUMENTS

| WO | 2017142924 A1 | 8/2017 |
| WO | 2017142929 A1 | 8/2017 |

OTHER PUBLICATIONS

Britanak V., et al., "Discrete Cosine and Sine Transforms: General Properties, Fast Algorithms and Integer Approximations," Acadmemic Press, 2007, pp. 16-38.

(Continued)

*Primary Examiner* — Tat C Chio

(74) *Attorney, Agent, or Firm* — Shumaker & Sieffert, P.A.

(57) ABSTRACT

A device for decoding video data can be configured to perform a multi-pass inverse transformation on a plurality of values to derive residual data that represents pixel differences between a current block of video data and a predictive block of the video data, wherein to perform a pass of the multi-pass inverse transformation, the device is configured to determine at least two matrices, wherein the at least two matrices comprise a first matrix and a second matrix; determine at least two vectors, wherein the at least two vectors comprise a first vector and a second vector; and perform at least two matrix-vector computations, wherein the at least two matrix-vector computations comprise a first matrix-vector computation based on the first matrix and the first vector and a second matrix-vector computation based on the second matrix and the second vector.

22 Claims, 21 Drawing Sheets

(51) Int. Cl.
| | |
|---|---|
| H04N 19/176 | (2014.01) |
| H04N 19/70 | (2014.01) |
| H04N 19/436 | (2014.01) |
| H04N 19/139 | (2014.01) |
| H04N 19/42 | (2014.01) |
| H04N 19/105 | (2014.01) |

(52) U.S. Cl.
CPC ......... *H04N 19/436* (2014.11); *H04N 19/439* (2014.11); *H04N 19/52* (2014.11); *H04N 19/70* (2014.11); *H04N 19/105* (2014.11)

(56) References Cited

U.S. PATENT DOCUMENTS

2016/0353113 A1* 12/2016 Zhang ................... H04N 19/13
2017/0238013 A1   8/2017 Said et al.
2017/0238019 A1   8/2017 Said et al.

OTHER PUBLICATIONS

Bross B., et al., "Versatile Video Coding (Draft 1)," Joint Video Experts Team (JVET) OF ITU-T SG 16 WP 3 and ISO/IEC JTC 1/SC 29/WG 11, 10th Meeting, Apr. 2018, JVET-J1001-v2, 43 pages.

Bross B., et al., "Versatile Video Coding (Draft 3)," Joint Video Experts Team (JVET) of ITU-T SG 16 WP 3 and ISO/IEC JTC 1/SC 29/WG 11, 12th Meeting: Macao, CN, JVET-L1001-v3, Oct. 3-12, 2018, 181 pages.

Bross B., et al., "Versatile Video Coding (Draft 4)," Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-v5, 287 pages.

Chen J., et al., "Algorithm description for Versatile Video Coding and Test Model 1 (VTM 1)," Joint Video Exploration Team (JVET) of ITU-T SG 16 WP 3 and ISO/IEC JTC 1/SC 29/WG 11, 10th Meeting: San Diego, US, Apr. 10-20, 2018, Jun. 16, 2018, JVET-J1002-v2, 10 pages, XP030198635, http://phenix.int-evry.fr/jvet/doc_end_used/documents/10_SanDiego/wg11/JVET-J1002-v2.zip.

Chen J., et al., "Algorithm Description of Joint Exploration Test Model 7 (JEM 7)," 7th Meeting; Joint Collaborative Team on Video Coding (JCT-VC) of ITU-T SG 16 WP 3 and ISO/IEC JTC 1/SC 29/WG 11, No. JVET-G1001v1, Jul. 13-21, 2017, 50 pages.

Egilmez, H., et al., "Graph-Based Transforms for Inter Predicted Video Coding" in Proc IEEE int. Conf. Image Process., Quebec City, Canada, Sep. 2015, pp. 3992-3996.

ITU-T H.265, "Series H: Audiovisual and Multimedia Systems, Infrastructure of audiovisual services—Coding of moving video, High efficiency video coding," The International Telecommunication Union. Dec. 2016, 664 pp.

Sezer O.G., et al., "Approximation and Compression with Sparse Orthonormal Transforms," IEEE Transactions on Image Processing, vol. 24, No. 8, Aug. 2015, pp. 2328-2343.

Sullivan G.J., et al., "Overview of the High Efficiency Video Coding (HEVC) Standard," IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI: 10.1109/TCSVT.2012.2221191.

Takamura S., et al., "On Intra Coding Using Mode Dependent 2D-KL T," in Proc 30th Picture Coding Symp, San Jose CA, Dec. 2013, pp. 137-140.

Wien M, "High Efficiency Video Coding," Coding Tools and specification, Chapter 5, 2015, pp. 133-160.

Ye Y., et al., "Improved H.264 Intra Coding Based on Bi-directional Intra Prediction, Directional Transform, and Adaptive Coefficient Scanning," 15th IEEE International Conference, Oct. 12 through 15, 2008, DOI: 10.1109/ICIP.2008.4712205; published on IEEE Xplore on Dec. 12, 2008, pp. 2116-2119.

International Search Report and Written Opinion—PCT/US2019/024064—ISA/EPO—dated Jul. 2, 2019.

Said A., et al.,"Highly Efficient Non-Separable Transforms for Next Generation Video Coding," 2016 Picture Coding Symposium (PCS), IEEE, Dec. 4, 2016 (Dec. 4, 2016), pp. 1-5, XP033086855, DOI: 10.1109/PCS.2016.7906345, [retrieved on Apr. 19, 2017], Introduction and Parametric Multi Pass Transform.

Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.

Chen J., et al., "Algorithm description for Versatile Video Coding and Test Model 3 (VTM 3)," Joint Video Experts Team (JVET) of ITU-T SG 16 WP 3 and ISO/IEC JTC 1/SC 29/WG 11, JVET-L1002-v1, 12th Meeting: Macao, CN, Oct. 3-12, 2018, 48 pages.

Zhao X., EE1: Improvements on non-separable secondary transform, Joint Video Exploration Team (JVET) of ITU-T SG16 WP3 and ISO/IEC JTC1/SC29/WG11 4th Meeting: Chengdu, CN, JVET-D0120, Oct. 15-21 2016, 5 pp.

Zhao X., et al., "EE2.7: TU-level non-separable secondary transform", Joint Video Exploration Team (JVET) of ITU-T 5G16 WP3 and ISO/IEC JTC1/SC29/WG11 3rd Meeting: Geneva, CH, May 26-Jun. 1, 2016, JVET-00053_v3, 10 pp.

* cited by examiner

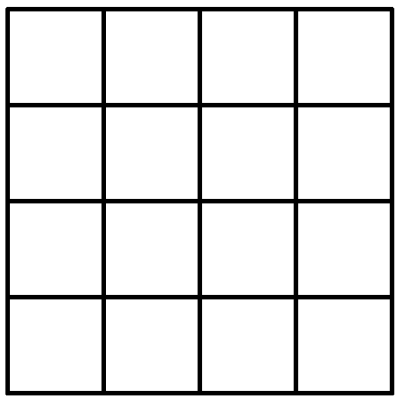
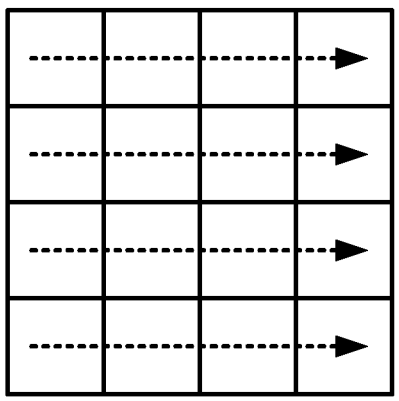
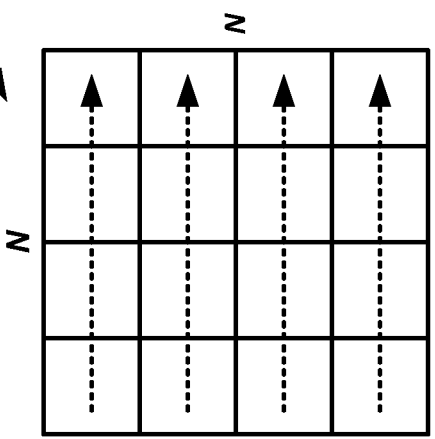

$y_i = \cos(\theta)r_i - \sin(\theta)r_j$
$y_j = \cos(\theta)r_j + \sin(\theta)r_i$ $r_i = \cos(\theta)y_i + \sin(\theta)y_j$
$r_j = -\sin(\theta)y_i + \cos(\theta)y_j$

| n | $B[0,n]$ | $B[1,n]$ | $B[2,n]$ | $C[0,n]$ | $C[1,n]$ | $C[2,n]$ | $b_o[n]$ |
|---|---|---|---|---|---|---|---|
| 0 | 0 | 0 | 0 | 0 | 0 | 0 | 0 |
| 1 | 1 | 0 | 0 | 0 | 0 | 1 | 4 |
| 2 | 0 | 1 | 0 | 1 | 0 | 0 | 1 |
| 3 | 1 | 1 | 0 | 1 | 0 | 1 | 5 |
| 4 | 0 | 0 | 1 | 0 | 1 | 0 | 2 |
| 5 | 1 | 0 | 1 | 0 | 1 | 1 | 6 |
| 6 | 0 | 1 | 1 | 1 | 1 | 0 | 3 |
| 7 | 1 | 1 | 1 | 1 | 1 | 1 | 7 |

# MINIMIZATION OF TRANSFORM MEMORY AND LATENCY VIA PARALLEL FACTORIZATIONS

This disclosure claims the benefit of U.S. Provisional Patent Application 62/648,321, filed Mar. 26, 2018, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Pictures may be referred to as frames, and reference pictures may be referred to as reference frames.

Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized. Entropy coding may be applied to achieve even more compression.

SUMMARY

In general, this disclosure is directed to techniques for encoding and decoding video data. In some examples, this disclosure describes techniques for performing transform coding at a video encoder and for performing inverse transform coding at a video decoder.

According to one example of this disclosure, a method of decoding video data includes determining, by a video decoder and based on syntax elements in an encoded video bitstream, a plurality of values for a current block of the video data; performing, by the video decoder, a multi-pass inverse transformation on the plurality of values to derive residual data that represents pixel differences between the current block of the video data and a predictive block of the video data, wherein performing a pass of the multi-pass inverse transformation comprises: determining at least two matrices, wherein the at least two matrices comprise a first matrix and a second matrix; determining at least two vectors, wherein the at least two vectors comprise a first vector and a second vector; and performing at least two matrix-vector computations, wherein the at least two matrix-vector computations comprise a first matrix-vector computation based on the first matrix and the first vector and a second matrix-vector computation based on the second matrix and the second vector; and reconstructing, by the video decoder, the current block of the video data based on the residual data and the predictive block of the video data.

According to another example of this disclosure, a method of encoding video data includes determining, by a video encoder and for a current block of the video data, residual data that represents pixel differences between the current block of the video data and a predictive block of the video data; performing, by the video encoder, a multi-pass non-separable transformation on the residual data to generate a plurality of values, wherein performing a pass of the multi-pass transformation comprises: determining at least two matrices, wherein the at least two matrices comprise a first matrix and a second matrix; determining at least two vectors, wherein the at least two vectors comprise a first vector and a second vector; and performing at least two matrix-vector computations, wherein the at least two matrix-vector computations comprise a first matrix-vector computation based on the first matrix and the first vector and a second matrix-vector computation based on the second matrix and the second vector; encoding, by the video encoder and in an encoded video bitstream, syntax elements that represent the plurality of values.

According to another example of this disclosure, a device for decoding video data includes a memory for storing video data and one or more processors implemented in circuitry. The one or more processors are configured to determine, based on syntax elements in an encoded video bitstream, a plurality of values for a current block of the video data; perform a multi-pass inverse transformation on the plurality of values to derive residual data that represents pixel differences between the current block of the video data and a predictive block of the video data, wherein to perform a pass of the multi-pass inverse transformation, the one or more processors: determine at least two matrices, wherein the at least two matrices comprise a first matrix and a second matrix; determine at least two vectors, wherein the at least two vectors comprise a first vector and a second vector; and perform at least two matrix-vector computations, wherein the at least two matrix-vector computations comprise a first matrix-vector computation based on the first matrix and the first vector and a second matrix-vector computation based on the second matrix and the second vector; and reconstruct, by the video decoder, the current block of the video data based on the residual data and the predictive block of the video data.

According to another example of this disclosure, a device for encoding video data includes a memory for storing video data and one or more processors implemented in circuitry. The one or more processors are configured to determine, for a current block of the video data, residual data that represents pixel differences between the current block of the video data and a predictive block of the video data; perform a multi-pass non-separable transformation on the residual data to generate a plurality of values, wherein to perform a pass of the multi-pass transformation, the one or more processors are configured to: determine at least two matrices, wherein the at least two matrices comprise a first matrix and a second matrix; determine at least two vectors, wherein the at least two vectors comprise a first vector and a second vector; and perform at least two matrix-vector computations, wherein the at least two matrix-vector computations comprise a first matrix-vector computation based on the first matrix and the first vector and a second matrix-vector computation based on the second matrix and the second vector; encode, in an encoded video bitstream, syntax elements that represent the plurality of values.

According to another example of this disclosure, an apparatus for decoding video data includes means for determining, by a video decoder and based on syntax elements in an encoded video bitstream, a plurality of values for a current block of the video data; means for performing, by the video decoder, a multi-pass inverse transformation on the plurality of values to derive residual data that represents pixel differences between the current block of the video data and a predictive block of the video data, wherein the means for performing a pass of the multi-pass inverse transformation comprises: means for determining at least two matrices, wherein the at least two matrices comprise a first matrix and a second matrix; means for determining at least two vectors, wherein the at least two vectors comprise a first vector and a second vector; and means for performing at least two matrix-vector computations, wherein the at least two matrix-vector computations comprise a first matrix-vector computation based on the first matrix and the first vector and a second matrix-vector computation based on the second matrix and the second vector; and means for reconstructing, by the video decoder, the current block of the video data based on the residual data and the predictive block of the video data.

According to another example of this disclosure, an apparatus for encoding video data includes means for determining, by a video encoder and for a current block of the video data, residual data that represents pixel differences between the current block of the video data and a predictive block of the video data; means for performing, by the video encoder, a multi-pass non-separable transformation on the residual data to generate a plurality of values, wherein the means for performing a pass of the multi-pass transformation comprises: means for determining at least two matrices, wherein the at least two matrices comprise a first matrix and a second matrix; means for determining at least two vectors, wherein the at least two vectors comprise a first vector and a second vector; and means for performing at least two matrix-vector computations, wherein the at least two matrix-vector computations comprise a first matrix-vector computation based on the first matrix and the first vector and a second matrix-vector computation based on the second matrix and the second vector; and means for encoding, by the video encoder and in an encoded video bitstream, syntax elements that represent the plurality of values.

According to another example of this disclosure, a computer readable storage medium stores instructions that when executed by one or more processors, cause the one or more processors to determine, based on syntax elements in an encoded video bitstream, a plurality of values for a current block of the video data; perform a multi-pass inverse transformation on the plurality of values to derive residual data that represents pixel differences between the current block of the video data and a predictive block of the video data, wherein to perform a pass of the multi-pass inverse transformation, the one or more processors: determine at least two matrices, wherein the at least two matrices comprise a first matrix and a second matrix; determine at least two vectors, wherein the at least two vectors comprise a first vector and a second vector; and perform at least two matrix-vector computations, wherein the at least two matrix-vector computations comprise a first matrix-vector computation based on the first matrix and the first vector and a second matrix-vector computation based on the second matrix and the second vector; and reconstruct the current block of the video data based on the residual data and the predictive block of the video data.

According to another example of this disclosure, a computer readable storage medium stores instructions that when executed by one or more processors, cause the one or more processors to determine, for a current block of the video data, residual data that represents pixel differences between the current block of the video data and a predictive block of the video data; perform a multi-pass non-separable transformation on the residual data to generate a plurality of values, wherein to perform a pass of the multi-pass transformation, the one or more processors are configured to: determine at least two matrices, wherein the at least two matrices comprise a first matrix and a second matrix; determine at least two vectors, wherein the at least two vectors comprise a first vector and a second vector; and perform at least two matrix-vector computations, wherein the at least two matrix-vector computations comprise a first matrix-vector computation based on the first matrix and the first vector and a second matrix-vector computation based on the second matrix and the second vector; encode, in an encoded video bitstream, syntax elements that represent the plurality of values.

The details of one or more examples are set forth in the accompanying drawings and the description below. Other features, objects, and advantages will be apparent from the description and drawings, and from the claims.

BRIEF DESCRIPTION OF DRAWINGS

FIG. 3A is a conceptual diagram illustrating an example option for computing separable transforms in a two-dimensional block of pixel residuals.

FIG. 3B is a conceptual diagram illustrating an example option for computing non-separable transforms in a two-dimensional block of pixel residuals.

FIG. 17 shows a table that illustrates an example of how a permutation of index bits is used to generate an operand assignment sequence, according to techniques of this disclosure.

DETAILED DESCRIPTION

Figure 1:
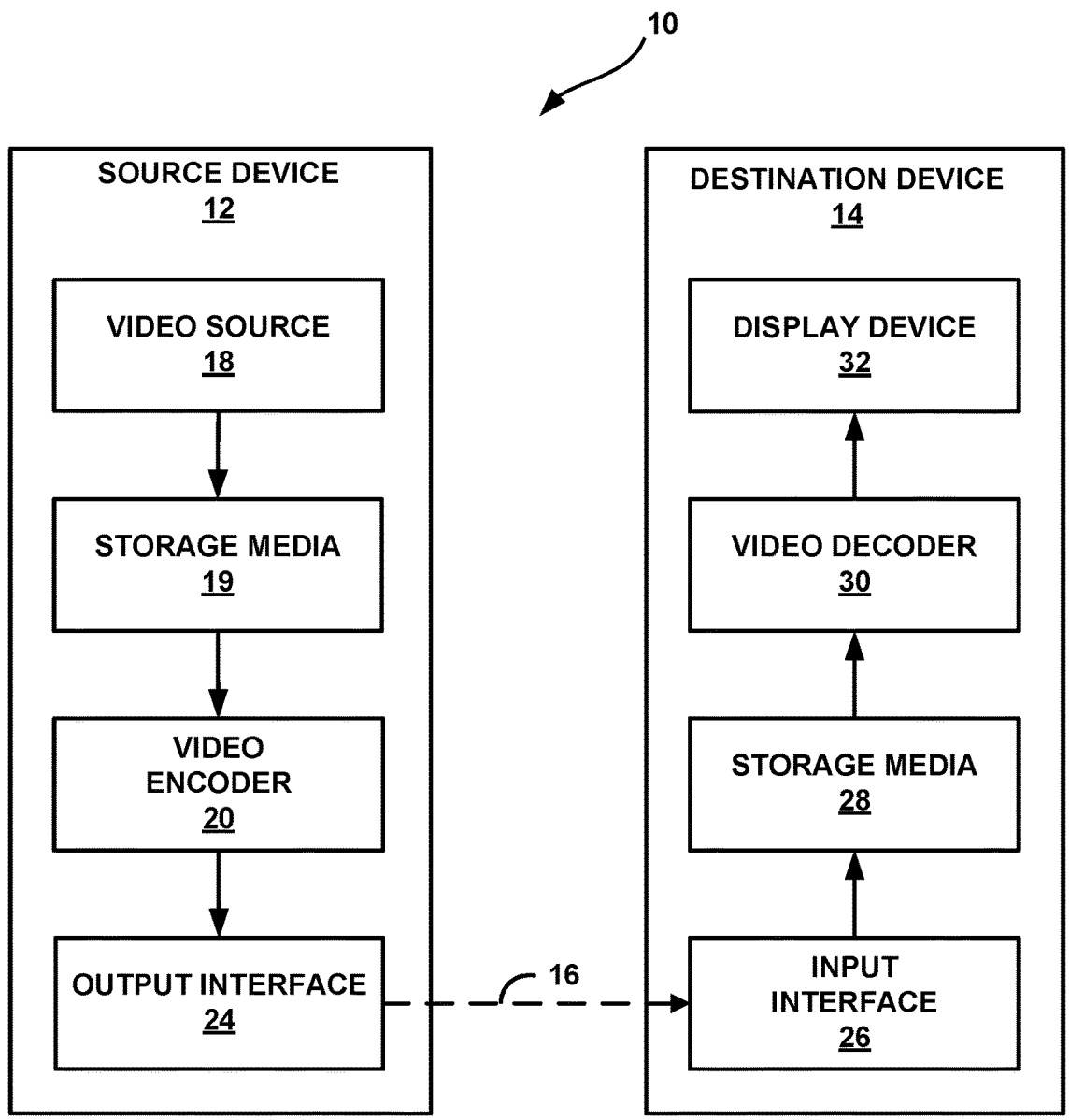
FIG. 1 is a block diagram illustrating an example video encoding and decoding system configured to implement techniques of the disclosure.

Video coding (i.e., video encoding and/or video decoding) involves predicting a block of video data from either an already-coded block of video data in the same picture (e.g., intra prediction or intra block copy) or an already coded block of video data in a different picture (e.g., inter prediction). In some instances, a video encoder also calculates residual data by comparing the predictive block to the original block. Thus, the residual data represents a difference between the predictive block and the original block. The video encoder transforms and/or quantizes the residual data to reduce the number of bits needed to signal the residual data in the encoded bitstream.

A video decoder performs an inverse transform and dequantization process on the transformed and quantized residual data to determine the residual data calculated by the encoder. The video decoder adds the residual data to the predictive block to produce a reconstructed block of video data that matches the original video block more closely than the predictive block alone. As the processes of transforming and inverse transforming and quantizing and dequantizing may be lossy, the residual data determined by the video decoder may not perfectly match the residual data determined by the encoder. Thus, the reconstructed block determined by the video decoder may not perfectly match the original block of video data. To further improve the quality of decoded video, the video decoder can perform one or more filtering operations on the reconstructed video blocks. Examples of these filtering operations include deblocking filtering, sample adaptive offset (SAO) filtering, and adaptive loop filtering (ALF).

This disclosure describes techniques associated with the transform coding of residual data. As introduced above, as part of encoding residual data, a video encoder may perform a transform process, and as part of the decoding the residual data, a video decoder may perform an inverse transform process. This disclosure describes techniques that may solve problems associated with the transform coding of residual data, which is a fundamental part of video compression standards. The techniques of this disclosure may reduce memory and computation for large numbers of non-separable transforms, potentially enabling large coding gains with reasonable costs. The techniques of this disclosure extend existing techniques for transform coding with Compact Multi-Pass Transforms (CMPTs), as described in U.S. Patent Publication 2017/0238019 A1, published 17 Aug. 2017, which replaces single-matrix transform computations, while potentially requiring significantly less memory and operations, and with very small loss in coding efficiency.

This disclosure presents a new family of solutions for transform coding, addressing two potential problems with CMPT. As an example of a first problem, even though CMPTs defined from parallel Givens rotations provide a much greater degree of parallelization than previous sequential Givens rotations, these existing techniques still require many passes, which may increase transform computation latency. U.S. Patent Publication 2017/0238013 A1, published 17 Aug. 2017, describes the Hypercube Givens Transform—HyGT, which is a specific example of CMPTs currently adopted in J. Chen, E. Alshina, G. J. Sullivan, J.-R. Ohm, J. Boyce, *Algorithm Description of Joint Exploration Test Model 7 (JEM 7)*, Document JVET-G1001, Joint Video Exploration Team (WET) of ITU-T SG 16 WP 3 and ISO/IEC JTC 1/SC 29/WG 11, Torino, IT, July 2017.

As an example of a second problem that the techniques of this disclosure may address, the most general forms of CMPTs can employ, at each pass, permutations on intermediary transform computation results. However, supporting all possible permutations can significantly increase memory and hardware requirements. This disclosure introduces techniques that potentially solve this problem by extending a technique used in HyGT, which is based on defining a small number of pre-defined ways to operate on those computation results (operand assignments), so that the techniques can be implemented with small hardware costs and can be signaled (or selected) using less memory than that required for the most general permutations.

According to the techniques of this disclosure, for performing transform processing or inverse transform processing, a video coder (e.g., a video encoder or video decoder) may perform a multi-pass process where a particular pass of the multi-pass process includes performing at least two matrix-vector computations based on at least two matrices and at least two vectors. By replacing single-matrix computations with a few passes of modular parallel matrix-vector computations, combined with re-assignment of intermediary results, the video coder may utilize smaller matrices which may enable more parallelism with reduced latency. Thus, by performing the at least two matrix-vector computations instead of a single-matrix computation, the techniques of this disclosure may improve the operation of a video encoder or video decoder.

Various techniques in this disclosure may be described with reference to video coding, which is intended to be a generic term that can refer to either video encoding or video decoding. Similarly, the term video coder is intended to be a generic term that can refer to either a video encoder or a video decoder. Unless explicitly stated otherwise, it should be assumed that techniques described with respect to a video encoder or a video decoder can be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure with respect to a video decoder may also be performed by a video encoder (e.g., as part of the video decoding loop or as part of implicit determination of filter information), and vice versa.

This disclosure may also use terms such as current layer, current block, current picture, current slice, etc. In the context of this disclosure, the term current is intended to identify a layer, block, picture, slice, etc. that is currently being coded, as opposed to, for example, previously coded layers, blocks, pictures, and slices or yet to be coded blocks, pictures, and slices.

FIG. 1 is a block diagram illustrating an example video encoding and decoding system 10 that may utilize the transform processing techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, storage media 19 configured to store video data, a video encoder 20, and an output interface 24. Destination device 14 includes an input interface 26, a storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general and may be applied to wireless and/or wired applications. In each case, the captured, pre-captured, or computer-generated video may be encoded by video encoder 20. Output interface 24 may output the encoded video information to a computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Storage media 28 may store encoded video data received by input interface 26. Display device 32 displays the decoded video data to a user and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable fixed-function and/or programmable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard such as an existing or future standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC) of ITU-T Video Coding Experts Group (VCEG) and ISO/IEC Motion Picture Experts Group (MPEG).

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate proposed compression technology designs. The JVET first met during 19-21 Oct. 2015 and developed several different versions of reference software, referred to as Joint Exploration Models (JEM). One example of such reference software is referred to as JEM 7 and is described in J. Chen, E. Alshina, G. J. Sullivan, J.-R. Ohm, J. Boyce, "Algorithm Description of Joint Exploration Test Model 7," JVET-G1001, 13-21 Jul. 2017.

Based on the work of ITU-T VCEG (Q6/16) and ISO/IEC MPEG (JTC 1/SC 29/WG 11), a new video coding standard, referred to as the Versatile Video Coding (VVC) standard, is under development by the Joint Video Expert Team (JVET) of VCEG and MPEG. An early draft of the VVC is available in the document JVET-J1001 "Versatile Video Coding (Draft 1)" and its algorithm description is available in the document JVET-J1002 "Algorithm description for Versatile Video Coding and Test Model 1 (VTM 1)." Another early draft of the VVC is available in the document JVET-L1001 "Versatile Video Coding (Draft 3)" and its algorithm description is available in the document JVET-L1002 "Algorithm description for Versatile Video Coding and Test Model 3 (VTM 3)." A recent draft of the VVC standard is described in Bross, et al. "Versatile Video Coding (Draft 4)," Joint Video Experts Team (JVET) of ITU-T SG 16 WP 3 and ISO/IEC JTC 1/SC 29/WG 11, 13$^{th}$ Meeting: Marrakech, Mass., 9-18 Jan. 2019, JVET-M1001-v5 (hereinafter "VVC Draft 4"). The techniques of this disclosure, however, are not limited to any particular coding standard.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive blocks (e.g., luma, Cb, and Cr predictive blocks) for prediction blocks (e.g., luma, Cb, and Cr prediction blocks) of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture that includes the PU.

After video encoder 20 generates predictive blocks (e.g., luma, Cb, and Cr predictive blocks) for one or more PUs of a CU, video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks into one or more transform blocks. For instance, video encoder 20 may use quad-tree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Transform coding is a fundamental part of modern video coding standards, like High-Efficiency Video Coding (HEVC) (as described in G. J. Sullivan, J.-R. Ohm, W.-J. Han, and T. Wiegand, "Overview of the High Efficiency Video Coding (HEVC) Standard," *IEEE Trans. Circuits Syst. Video Technol.*, vol. 22, no. 12, pp. 1649-1668, December 2012; M. Wien, *High Efficiency Video Coding: Coding Tools and Specification*, Springer-Verlag, Berlin, 2015). It is known that optimal transform coding should employ the matrix-based Karhunen-Loève Transforms (KLTs) (or similarly adaptive transforms), because such transforms can be optimized to particular signal statistics. However, the matrix implementation tends to require a relatively high number computations and a relatively high amount of memory. In practice, fixed separable transforms like the Discrete Cosine Transform (DCT) use fewer computations and less memory to implement the transform, and therefore, have been widely adopted.

This disclosure describes techniques that enable obtaining coding gains nearly equal to those achieved using KLTs, but with significantly less memory and computation. In some examples, techniques of this disclosure are based on: (a) creating a set of data-specific transforms that can be tested by video encoder 20, and then video encoder 20 may choose the best data-specific transforms (e.g., those that minimize distortion). Video encoder 20 may send (e.g. signal) its index for use by video decoder 30, and (b) a technique to approximate the multiplication of a vector by the transform matrix, called Compact Multi-Pass Transform (CMPT). The techniques of this disclosure may use less memory and computation, as compared to the non-separable matrix based operations, because CMPT techniques are specifically optimized for video coding purposes, and use coding gain estimates to identify unimportant transform parameters and computations. CMPTs allows for many types of implementations, and, as a practical example, an implementation based on a transform approximation technique called Hypercube-Givens Transform (HyGT).

Figure 2:
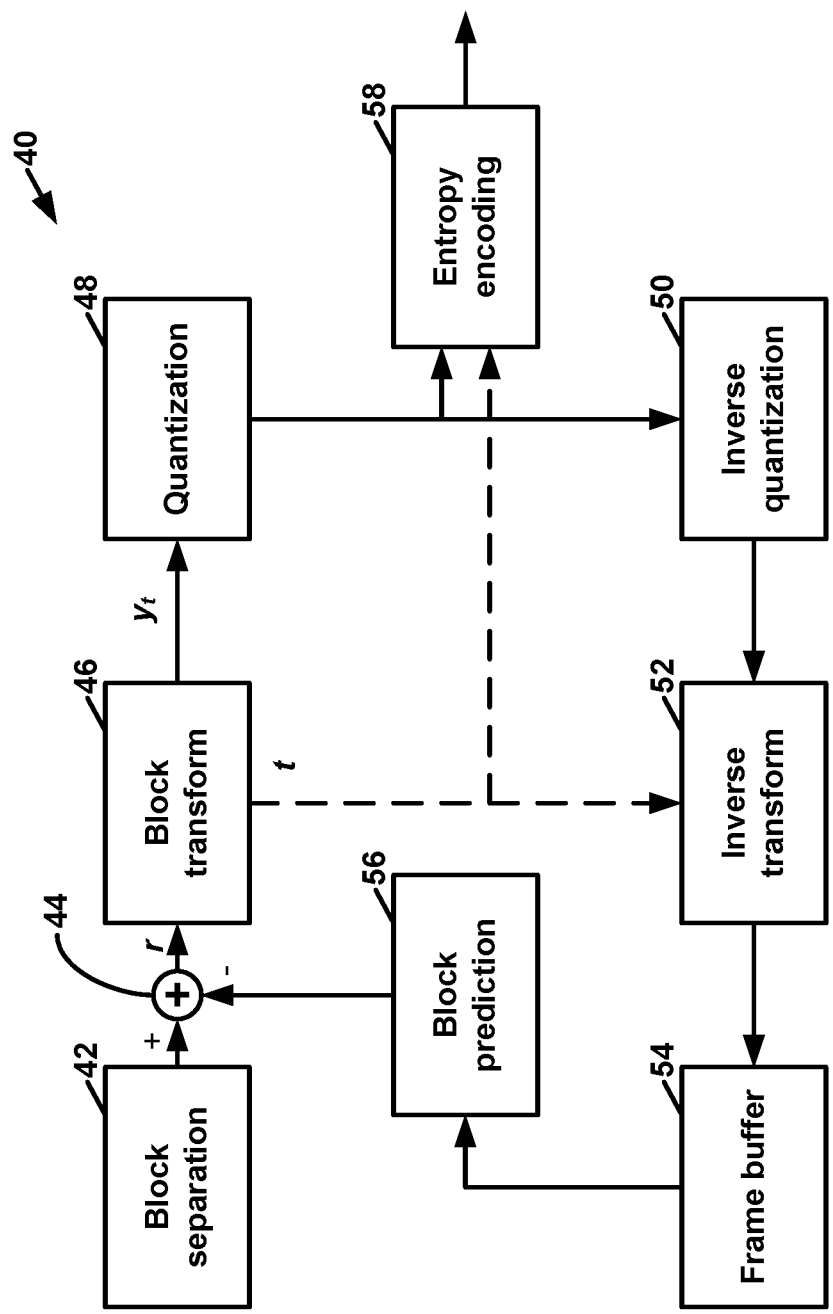
FIG. 2 is a block diagram illustrating an example system for hybrid video encoding with transform selection.

FIG. 2 is a block diagram illustrating an example system 40 for hybrid video encoding with transform selection. Particularly, FIG. 2 shows a diagram of a video encoding system (i.e., a video encoder, such as video encoder 20), where video frames are first divided into pixel blocks (block separation 42). Example types of pixel blocks may include coding blocks for CUs. Furthermore, in FIG. 2, in each block, the video encoder subtracts each pixel value from its predicted value (44). The video encoder numerically transforms the blocks of differences (i.e., residuals) using a linear operation (block transform 46). In the example of FIG. 2, r denotes residual data, $y_t$ denotes transformed residual data, and t denotes an indication of which transform was applied to the residual to generate $y_t$.

A linear transformation can be implemented by matrix-vector multiplications, but video coding applications have been using some special fast transforms that have fixed coefficients derived from trigonometric functions, and that can be computed much more efficiently than the equivalent matrix-vector products. See V. Britanak, P. C. Yip, and K. R. Rao, Discrete Cosine and Sine Transforms: General Properties, Fast Algorithms and Integer Approximations, Academic Press, 2007. However, in the context of this disclosure, it is important to note that the concept of computational efficiency has been changing with the advent of new hardware technologies. For instance, in some applications, decreasing the computational latency may be more important than reducing the number of arithmetic operations, which is the conventional measure of computational complexity.

In FIG. 2, the video encoder may quantize the transformed residual data (quantization 48) and inverse quantize (inverse quantization 50) the quantized transformed residual data. Furthermore, the video encoder may apply an inverse transform to the inverse quantized transformed residual data (inverse transform 52) to recover the residual data. A frame buffer 54, also called decoded picture buffer (DPB), of the video encoder stores reconstructed pixel blocks determined based on the residual data. The video encoder may use reconstructed pixel blocks stored in frame buffer 54 for prediction of other pixel blocks (block prediction 56). In the example of FIG. 2, the inverse transform applied to the transformed residual data by the video encoder may be determined based on the transform previously applied to generate the transformed residual data. The indication of which transform was applied to generate the transformed residual data may be provided to an entropy encoding unit 58 of the video encoder. The entropy encoding unit 58 may entropy encode a syntax element indicating the transform along with syntax elements indicating the quantized transformed residual data.

FIGS. 3A and 3B show example options for applying transforms to a two-dimensional block of video residuals. Particularly, FIG. 3A is a conceptual diagram illustrating an example option for computing separable transforms in a two-dimensional block of pixel residuals. FIG. 3B is a conceptual diagram illustrating an example option for computing non-separable transforms in a two-dimensional block of pixel residuals.

In the first option (e.g., FIG. 3A), called separable, the residuals are transformed separately, first in rows and then in columns (or vice-versa), as indicated by the arrows in FIG. 3A. More specifically, for each respective row of an N×N input block 60, a video encoder/decoder (generically referred to as video coder) produces a row of an intermediate block 62 by multiplying a vector consisting of elements of the respective row by an N×N transform matrix. For each respective column of intermediate block 62, the video coder produces a column of an output block by multiplying a vector consisting of elements of the respective column by an N×N transform matrix.

In the second type of block transformation (e.g., FIG. 3B), called non-separable, all residuals are put together into a single vector, as shown in FIG. 3B, and are transformed together. This option does not exploit the two-dimensional structure of the pixel blocks, but this option is more general and powerful, and can exploit directional features different from horizontal and vertical. For instance, for an input block 64 consisting of N×N values, the transform matrix is $N^2 \times N^2$. To determine an output block or vector 66, the video coder multiplies input block 64 by the transform matrix.

To minimize the computational complexity, video coding standards had been using only one block size and one type of separable transform (the DCT). With the recent adoption of HEVC, separable transforms are defined for several block sizes, and the Discrete Sine Transform (DST) has been adopted.

Even better compression can be achieved if a video encoder can test several different transforms, use the transform that yields best compression, and send an index t of the used transform to a video decoder, as shown in FIG. 2 (See Y. Ye and M. Karczewicz, "Improved H.264 intra coding based on bi-directional intra prediction, directional transform, and adaptive coefficient scanning," in *Proc. IEEE Int. Conf. Image Process.*, San Diego, Calif., October 2008, pp. 2116-2119; S. Takamura and A. Shimizu, "On intra coding using mode dependent 2D-KLT," in *Proc. 30th Picture Coding Symp.*, San Jose, Calif., December 2013, pp. 137-140; O. G. Sezer, O. G. Guleryuz, and Y. Altunbasak, "Approximation and compression with sparse orthonormal transforms," *IEEE Trans. Image Processing*, pp. 2328-2343, August 2015; and H. E. Egilmez, A. Said, Y.-H. Chao, and A. Ortega, "Graph-based transforms for inter predicted video coding," in *Proc. IEEE Int. Conf. Image Process.*, Quebec City, Canada, September 2015, pp. 3992-3996). In some examples, the index t may identify the transform by indicating the transform in a list of transforms.

This disclosure considers that an optimal KLT is derived by first computing, for each transform index t, a conditional residual correlation matrix $$C_t = E_{r|t}\{rr^t\}, \quad (1)$$

and then computing an orthogonal matrix $K_t$ that diagonalizes the correlation matrix, i.e., $$K_t C_t K_t^t = D_t. \quad (2)$$

Matrix $K_t$ is normally used directly for the computation of the vector of transform coefficients $y_t$ (FIG. 2), through the matrix-vector product $$y_t = K_t r. \quad (3)$$

A potential problem with implementing transforms for video coding using single matrix-vector multiplications is that for a transform of dimension N, the number of operations needed for computing the transform, and memory required for its definition, are proportional to N 2. For video coding, where blocks of video residuals have dimension like N=22K, the computational complexity is proportional to 24K, which becomes too large very quickly. In recent applications, the most serious problem is the amount of memory required to store the parameters of many transforms.

In applications different from media compression the complexity of matrix-vector operations can be reduced by using matrices that are sparse or have special structures. However, those techniques cannot be applied in the video coding case because matrices (denoted as Kt) have to be orthogonal, and if strict sparsity constraints are added directly to this type of matrices, their compression effectiveness disappears.

A solution presented in U.S. Patent Publication No. 2017/0238019, filed 14 Feb. 2017, (and this disclosure) is based on two main ideas. First, the computations are not meant to compute the KLT transform exactly. Instead, a video coder uses a set of vector transformations $M_t(x)$ (i.e., a transformation that maps one vector to another vector of the same dimension) that only gives an approximation to the KLT, in the form $$z_t = M_t(r) \approx y_t = K_t r. \quad (4)$$

According to the techniques of this disclosure, the full matrix-vector product may be replaced with a sequence of Pt different vector transformations $M_{t,p}$ (called passes), each with parameter vector $h_{t,p}$, in the functional form $M_{t,p}(x, h_{t,p})$, and the final residual transformation is in the form:

$$z_t = M_{t,P_t}(M_{t,P_t-1}(\ldots M_{t,2}(M_{t,1}(r;h_{t,1}),h_{t,2})\ldots,h_{t,P_t-1}),h_{t,P_t}). \quad (5)$$

Figure 4:
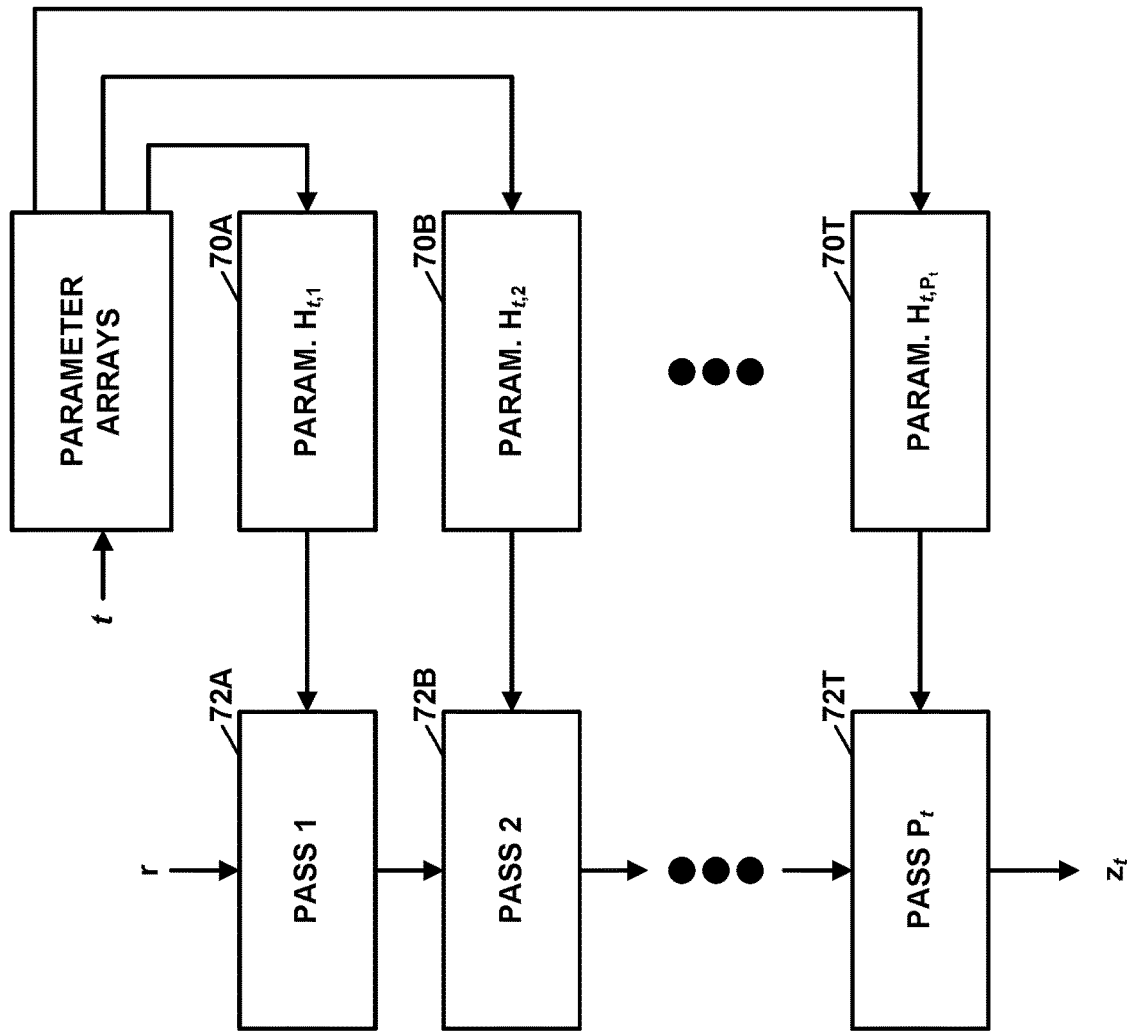
FIG. 4 is a conceptual diagram illustrating an example Compact Multi-Pass Transform (CMPT) implementation, in accordance with a technique of this disclosure.

The techniques of this disclosure cover this type of vector transformation with Pt passes, which is referred to herein as the Compact Multi-Pass Transform (CMPT). An implementation of a CMPT is shown in the diagram of FIG. 4. In other words, FIG. 4 is a diagram of a Compact Multi-Pass Transform implementation, in accordance with a technique of this disclosure. For the purpose of this disclosure, the definition of a CMPT is quite general, but most of these general features may be needed in practice. For the complexity metrics shown in Table I, limitations on a CMPT for a transform on a vector of dimension N may be: (1) the amount of memory to represent the set of parameters of a CMPT pass should be proportional to N; (2) each CMPT pass can be possibly computed in parallel using a number of processing elements proportional to N, each requiring a time (number of operations) that is independent of N (constant).

In the example of FIG. 4, a video coder applies a transform to an input block r. In instances where the video coder is encoding video data, the input block may comprise residual samples. In instances where the video coder is decoding video data, the input block may comprise transform coefficients. Furthermore, in the example of FIG. 4, the video coder determines a plurality of parameter arrays 70A-70T (collectively, parameter arrays 70) based on input t (e.g., index used to identify transform). In some examples, the video coder stores parameter arrays 70 in a memory or derives parameter arrays from data stored in a memory. Input t may indicate which transform to apply. In some examples, input t is an index into a list of transforms. Different transforms may be associated with different parameter arrays and/or different passes. In some examples, input t comprises one or more pieces of data that do not explicitly identify a transform. For instance, input t may comprise one or more of a block size, a prediction mode (e.g., intra or inter prediction), an intra prediction mode, and so on. In such examples, input t may not be an index into the list of transform, but some other information that can be used to determine the transform.

In the example of FIG. 4, to apply the transform, the video coder performs a series of passes 72A-72T (collectively, passes 72). Each respective pass of the series of passes transforms input data based on a respective parameter array of the determined plurality of parameter arrays. The input block r is the input data of the first pass of the series of passes. The input data of each pass of the series of passes other than the first pass is the output data of a previous pass of the series of passes. The output of the last pass of the series of passes is the transformed block $z_t$. As described elsewhere in this disclosure, each pass may comprise a set of orthogonal transformations, such as Givens orthogonal transforms. The video coder may perform the orthogonal transformations within a pass with concurrent (parallel) computations. For instance, sets of independent Givens transforms can be computed concurrently using several processors.

The optimal set of parameters $h_{t,p}$ may be found in various ways. For example, the optimal set of parameters $h_{t,p}$ may be found by performing a search of possible parameter values and identifying combinations of parameter values that tend to yield the best results. In this example, the search may be performed separate from the encoding or decoding process. The normative syntax may define (1) which are the transformations that are valid, and what are their allowed parameters and (2) a syntax defining how the encoder conveys the information about the transformation and respective parameters to be used for decoding. In some examples, the optimal set of parameters may be precomputed and stored at each of video encoder 20 and video decoder 30.

Figure 5:
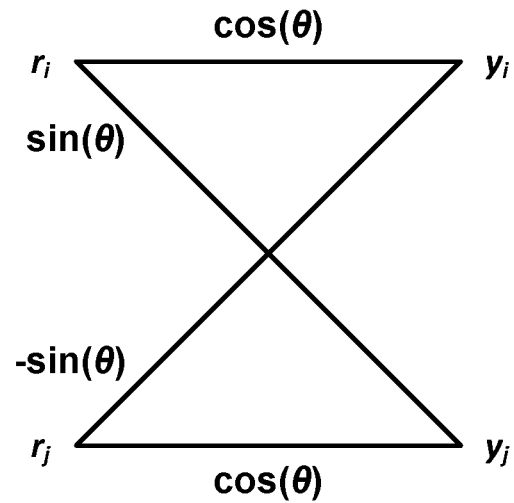
FIG. 5 is a "butterfly" diagram representing a Givens orthogonal transformation, parameterized by angle θ, applied to a pair of vector elements, and the transformation equations, in accordance with a technique of this disclosure.

As an example, in one particular implementation of the CMPT, sequences of parallel Givens orthogonal transformations (rotations), applied to disjoint sets of pairs of vector elements, are used. FIG. 5 shows a "butterfly" diagram commonly used to represent such transformations, and its mathematical meaning. Thus, in the example of FIG. 5, the butterfly receives $r_i$ and $r_j$ as inputs and also receives a parameter $\theta$ as input. The outputs of the butterfly are $y_i$ and $y_j$. $y_i$ is calculated as $\cos(\theta)r_i - \sin(\theta)r_j$. $y_j$ is calculated as $\cos(\theta)r_j + \sin(\theta)r_i$. When applying an inverse transform, video decoder 30 may calculate $r_i$ as $y_i \cos(\theta) + y_j \sin(\theta)$ and $r_j$ as $-y_i \sin(\theta) + y_j \cos(\theta)$. Although FIG. 5, and other examples of this disclosure, are described with respect to Givens rotations, other transforms may be used instead of the Givens rotation, such as the Householder transformation, Euler rotations with 3 or more angles, and other transformations.

Figure 6:
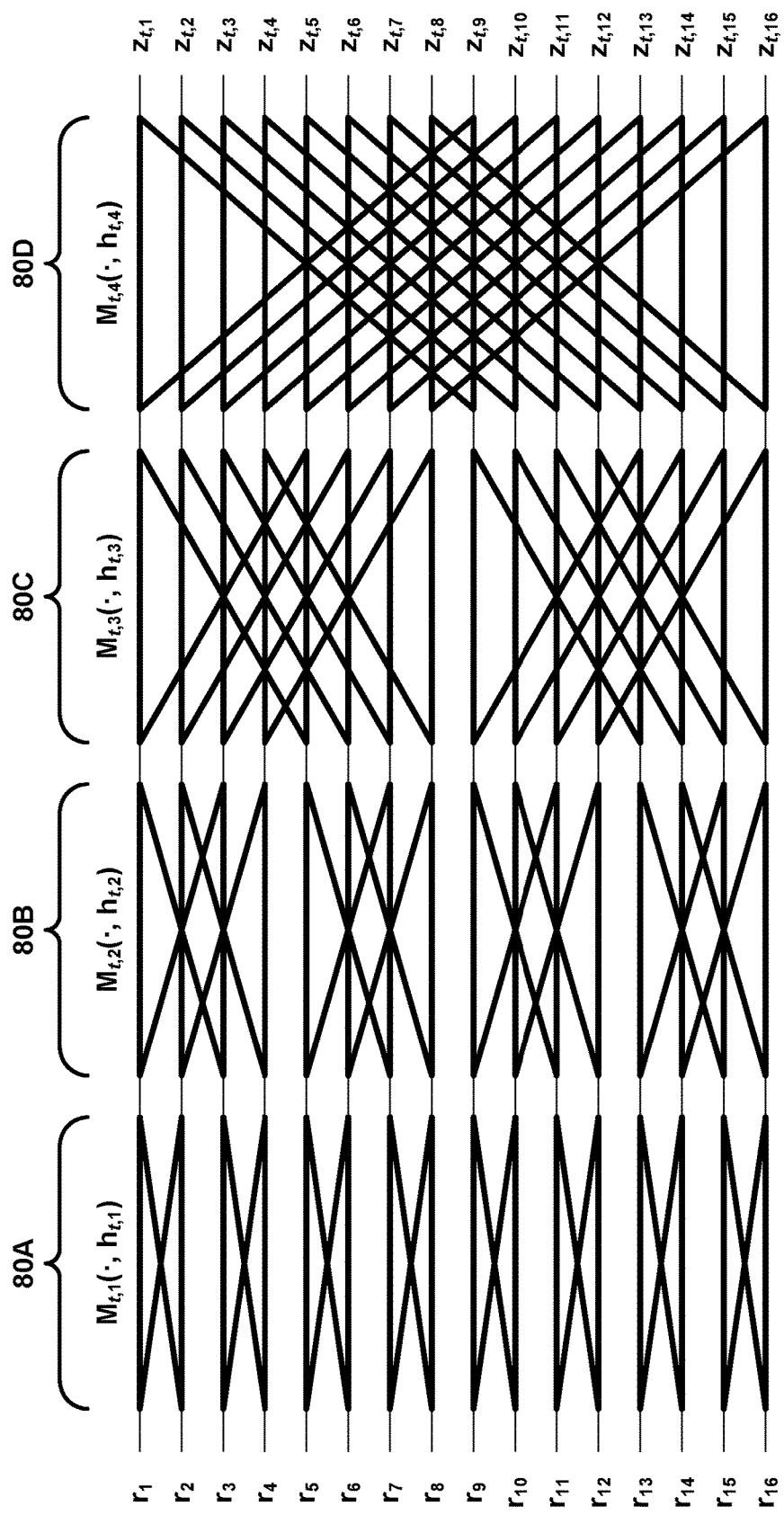
FIG. 6 is a diagram of a CMPT implementation using sequences of parallel Givens rotation, on vectors of dimension 16, in accordance with a technique of this disclosure.

FIG. 6 is a diagram of a Compact Multi-Pass Transform implementation using sequences of parallel Givens rotation on vectors of dimension 16. The Givens rotations are parallel in the sense that the Givens rotations applied within one pass can be applied in parallel. Those parallel Givens rotations (the Parallel Givens Transform—PGT) can be arranged sequentially together with permutation passes, as shown in FIG. 6. The transform of FIG. 6 can be considered to have a hypercube topology in the sense that each of inputs $r_1 \ldots r_{16}$ may be considered a separate dimension. The example of FIG. 6 is a case that obtains the memory and operations complexity as shown in the last row of Table I, below. In the example of FIG. 6, the CMPT includes four passes, 80A, 80B, 80C, and 80D. However, in other examples, other numbers of passes are possible.

In the example of FIG. 6, the parameter vectors $h_{t,p}$ contain the different angles ($\theta$) to be used by each butterfly, in the corresponding pass, plus the indexes need for implementing the permutations. For example, the parameter vector $h_{t,1}$ may be $\{0°, 20°, 40°, 60°, 80°, 100°, 120°, 140°\}$, the parameter vector $h_{t,2}$ may be $\{5°, 25°, 45°, 65°, 85°, 105°, 125°, 145°\}$, and so on.

In some examples, video encoder 20 and video decoder 30 may use, and in some instances store, different parameter vectors for different transformations, different block sizes, and different passes. For example, video encoder 20 and video decoder 30 may use parameter vectors $\{0°, 20°, 40°, 60°\}$ and $\{5°, 25°, 45°, 65°\}$ with 8×8 blocks. Furthermore, in this example, video encoder 20 and video decoder 30 may use parameter vectors $\{2°, 22°, 42°, 62°, 82°, 102°, 122°, 142°\}$, $\{5°, 25°, 45°, 65°, 85°, 105°, 125°, 145°\}$, $\{7°, 27°, 47°, 67°, 87°, 107°, 127°, 147°\}$, and $\{0°, 20°, 40°, 60°, 80°, 100°, 120°, 140°\}$ with 16×16 blocks.

In the example of FIG. 6, each butterfly corresponds to a Givens rotation shown in FIG. 5. Thus, in the example of FIG. 6, in each pass, eight Givens rotations are performed (e.g., in parallel). For each respective pass p, each of the Givens rotations in the respective pass may use a different parameter value (e.g., $\theta$) from the parameter vector for the respective pass ($h_{t,p}$). For example, for the top-left butterfly of FIG. 6, if the first parameter value in a parameter vector for round 1 (i.e., $h_{1,1}$) is equal to 45°, the outputs of the top-left butterfly are equal to $\cos(45°)r_1 - \sin(45°)r_2$ and $\cos(45°)r_2 + \sin(45°)r_1$. In some examples, two or more of the Givens rotations in a pass may include the same parameter value (e.g., $\theta$).

Note in FIG. 6 that the structure of transformations $M_{t,p}(x, h_{t,p})$, changes with each pass. Thus, different results are obtained if the order of the parameters or transformations is changed. For example, different results may be obtained if the butterflies of pass 80B of FIG. 6 were swapped with the butterflies of pass 80A of FIG. 6.

In this way, video encoder 20 may determine residual values for a current block of a current picture of the video data. Additionally, video encoder 20 may apply a transformation to the residual values (e.g., r of FIG. 4, values $r_1 \ldots r_{16}$ of FIG. 6) for the current block to derive a plurality of data elements (e.g., $z_t$ of FIG. 4, values $z_{t,1}$ of FIG. 6) for the current block. As part of applying the transformation to the residual values for the current block, video encoder 20 applies a sequence of vector transformations (e.g., passes 72 of FIG. 4, passes 80 of FIG. 6). The input values for the first vector transformation (e.g., pass 72A of FIG. 4, pass 80A of FIG. 6) of the sequence of vector transformations comprise the residual values for the current block. Output values of the last vector transformation (e.g., pass 72T of FIG. 4, pass 80A of FIG. 6) of the sequence of vector transformations comprise the data elements for the current block. For each respective vector transformation of the sequence of vector transformations other than the first vector transformation of the sequence of vector transformations, input values for the respective vector transformation comprise output values of the respective previous vector transformation of the sequence of vector transformations. Each respective vector transformation of the sequence of vector transformations further takes, as input, a respective parameter vector (e.g., $h_{t,1} \ldots h_{t,Pt}$ in FIG. 4, $h_{t,1} \ldots h_{t,4}$ in FIG. 6) for the respective vector transformation, the respective parameter vector for the respective vector transformation comprising one or more parameters. Video encoder 20 may include, in a bitstream that comprises an encoded representation of the current picture, syntax elements having values based on the data elements for the current block.

Video decoder 30 may apply an inverse of the transform used in encoding. For instance, in the example of FIG. 6, $z_{t,1}$ through $z_{t,16}$ may serve as input to the transformation and $r_1$ through $r_{16}$ is output of the transformation. Where Givens orthogonal transformations are used, the inputs of the inverse Givens orthogonal transform are $y_i$ and $y_j$ and the outputs are $r_i$ and $r_j$, and $r_i = \cos(\theta)y_i + \sin(\theta)y_j$; $r_j = \cos(\theta)y_j - \sin(\theta)y_i$.

In this way, video decoder 30 may determine, based on syntax elements in a bitstream that comprises an encoded representation of a current picture of the video data, a plurality of data elements (e.g., transform coefficients, values $z_{t,1}$-$z_{t,16}$ in FIG. 6) for a current block of the current picture. Additionally, video decoder 30 may apply a transformation to the data elements to derive residual values (e.g., values $r_1 \ldots r_{16}$ in FIG. 6) for the current block. The transformation comprises a sequence of vector transformations (e.g., passes 72 of FIG. 4, passes 80 of FIG. 6). As shown in FIG. 6, input values for the first vector (e.g., pass 72A of FIG. 4, pass 80D of FIG. 6) transformation of the sequence of vector transformations comprise the plurality of data elements. Furthermore, as shown in FIG. 6, output values for the last vector transformation (e.g., pass 72T of FIG. 4, pass 80A of FIG. 6) of the sequence of vector transformations comprise the residual values for the current block. For each respective vector transformation of the sequence of vector transformations other than the first vector transformation of the sequence of vector transformations, input values for the respective vector transformation comprise output values of the respective previous vector transformation of the sequence of vector transformations. Furthermore, each respective vector transformation of the sequence of vector transformations further takes, as input, a respective parameter vector (e.g., $h_{t,1} \ldots h_{t,Pt}$ in FIG. 4, $h_{t,1} \ldots h_{t,4}$ in FIG. 6) for the respective vector transformation, the respective parameter vector for the respective vector transformation comprising one or more parameters. As described elsewhere in this disclosure, video decoder 30 may reconstruct, based on the derived residual data, samples of the current picture.

Figure 7:
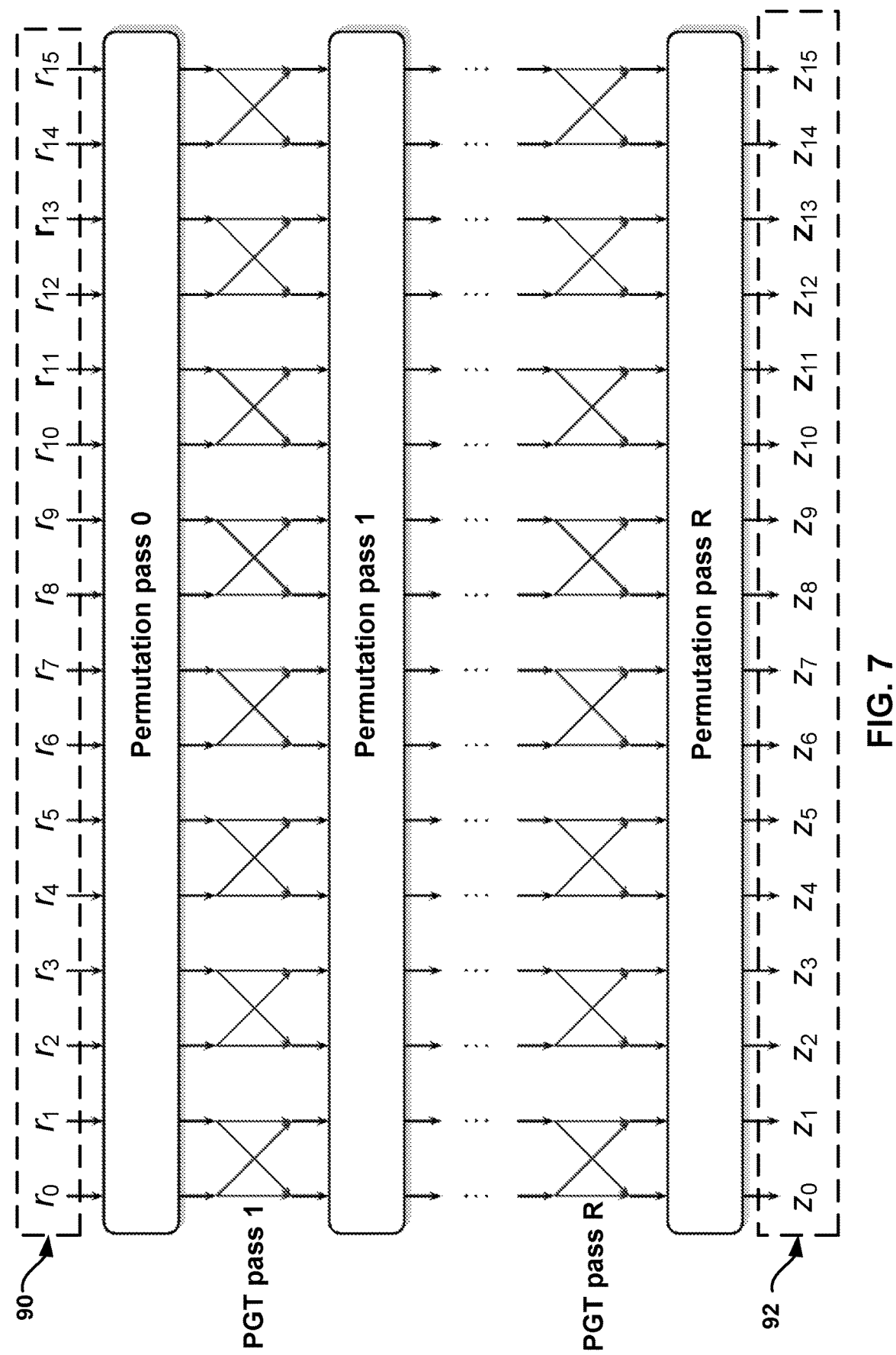
FIG. 7 shows an example implementation of the CMPT using passes of Parallel Givens Transforms (PGT) and permutations, on vectors of dimension N=16.

FIG. 7 shows an example implementation of the CMPT using passes of Parallel Givens Transforms (PGT) and permutations, on vectors of dimension N=16. In the example of FIG. 7, residual data 90 is transformed into transform coefficients 92. One potential disadvantage of the CMPT implementation as shown in FIG. 7 is that, in the most general case, it is necessary to include all indexes of the permutation passes as parameters of the transform, which may undesirably increase the amount of memory needed and the number of memory accesses needed.

Figure 8:
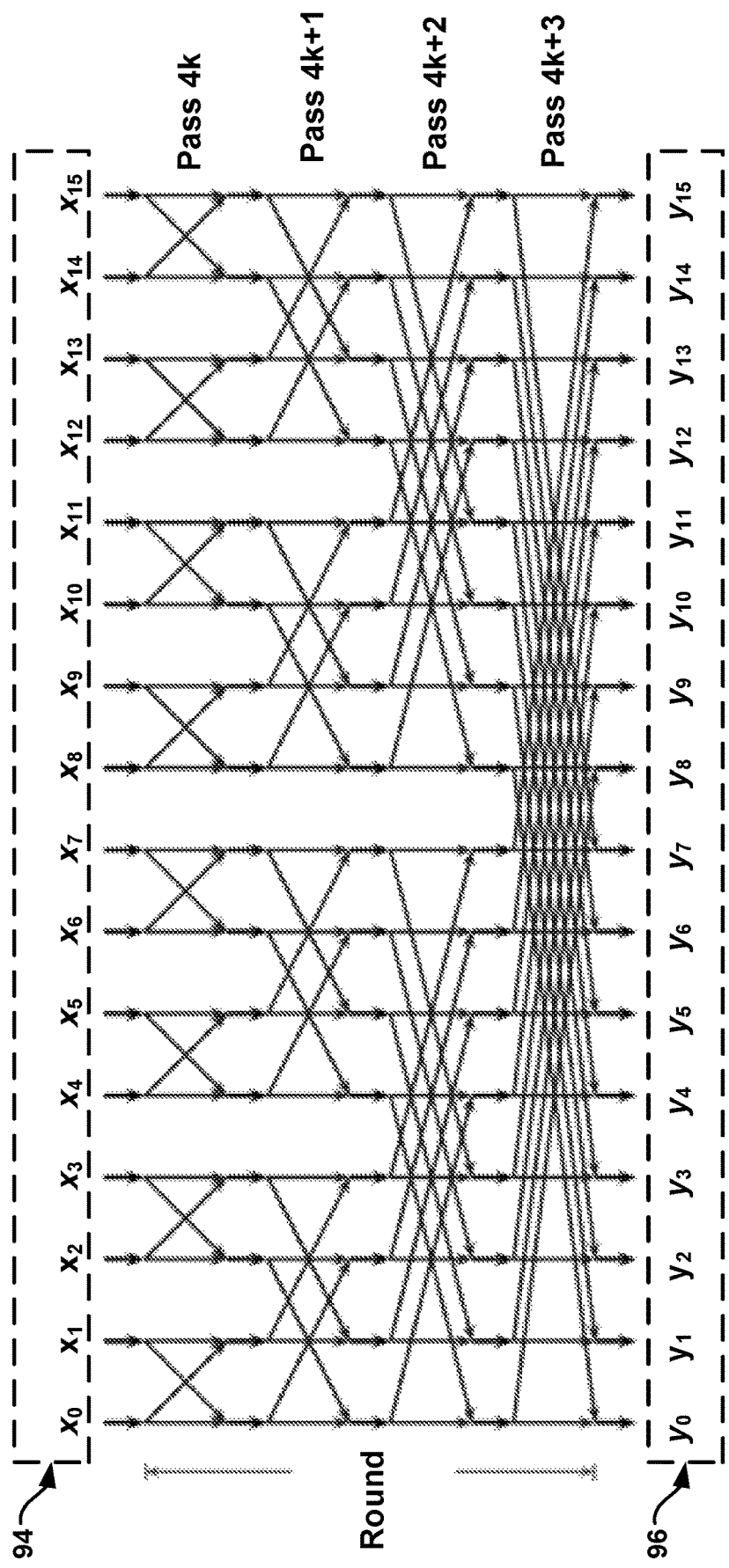
FIG. 8 shows an example diagram of a single round of the Hypercube Givens Transform (HyGT) implementation.

To avoid having to use additional memory to store the permutation indexes, the Hypercube Givens Transform (HyGT) was proposed in U.S. Patent Publication 2017/0238013 A1, published 17 Aug. 2017. It is a special case of the CMPT of FIG. 7, where the permutations are pre-defined according to the transform dimension. FIG. 8 shows the example of how, after the fixed permutations are applied to butterfly elements, the transform is computed. As only one angle per butterfly is needed, in this case the parameter vectors have half of the dimension of the residual vector r.

FIG. 8 shows an example diagram of a single round of the Hypercube Givens Transform (HyGT) implementation, using pre-defined sequences of parallel Givens rotations on vectors of dimension N=16. In the example of FIG. 8, input data 94 is transformed into output data 96. In the example of FIG. 8, the crisscrossing lines represent the operations of Givens rotations, also referred to as butterflies, as shown in FIG. 5.

Figure 9:
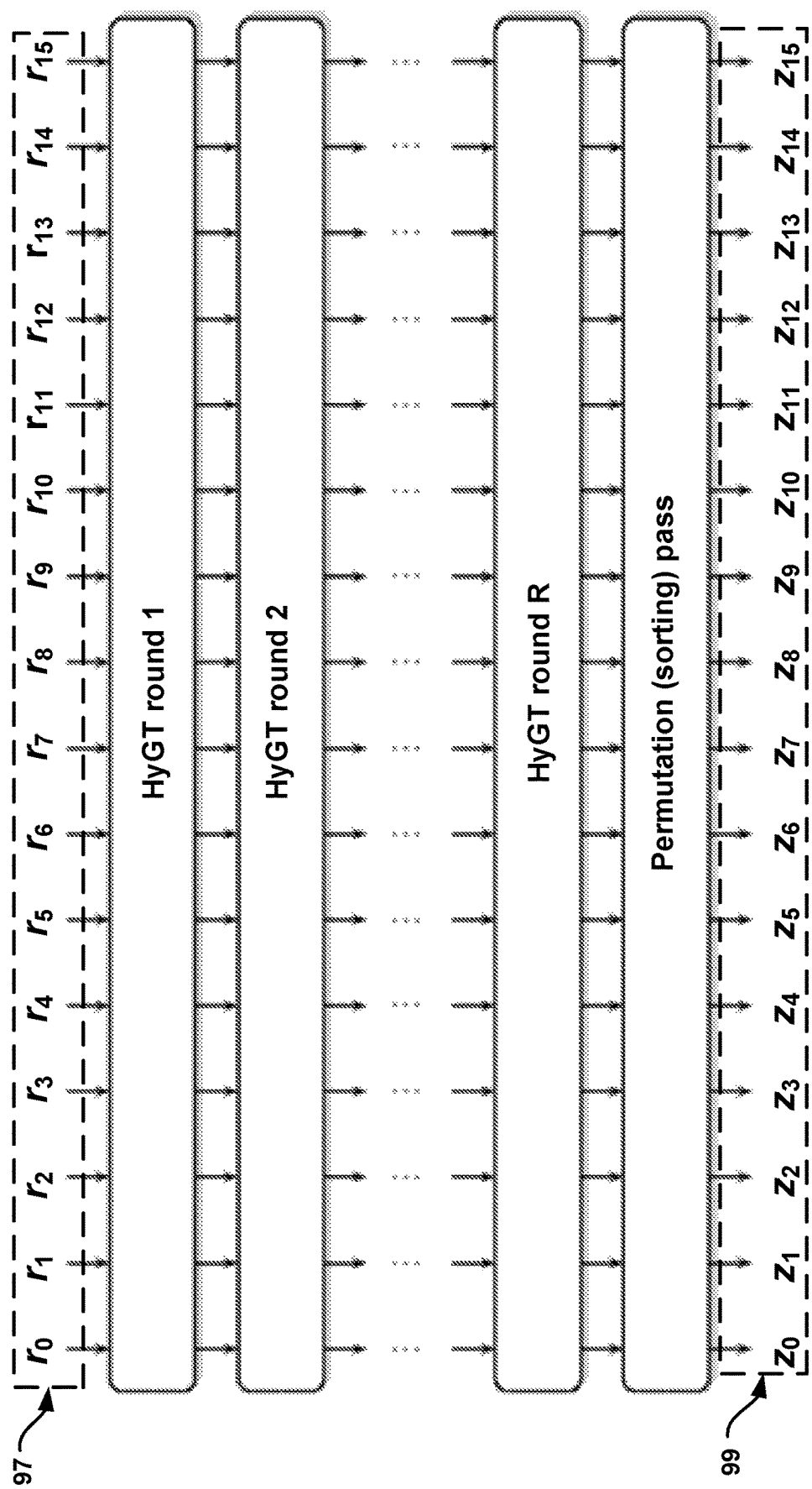
FIG. 9 shows a diagram of the full HyGT implementation using multiple rounds.

FIG. 9 shows a diagram of the full Hypercube Givens Transform (HyGT) implementation using multiple rounds, on vectors of dimension N=16. In the example of FIG. 9, residual data 97 is transformed into transform coefficients 99. The full HyGT transform is implemented with multiple rounds, as shown in FIG. 9. Thus, the calculations and processes shown with respect to FIG. 8 are performed for each of HyGT rounds 1 through R shown in FIG. 9.

The techniques of this disclosure may use various implementation types. It can be shown that, mathematically, the transforms of FIG. 8 are a special case of the transforms of FIG. 7, when only a subset of all possible permutations is employed. However, the figures show one important difference, related to the fact that in practice these transforms can be implemented in two different ways.

In a first type of implementation (exemplified by FIG. 7), the intermediary computation results of each pass are reorganized (moved to different memory locations) according to that pass' permutation, before additional computations are done in the following pass. In terms of the Givens rotations, computation results are moved, but not the indexes of the "butterflies" which are used to compute those results.

In a second type, shown in FIG. 8, the computation results are not moved, and instead indexes of the permutation are used during the following transform computations to define how the computation elements are organized. In the case of the Givens rotations of FIG. 8, the data remain in place, while the "butterflies" are modified. This may be referred to as operand assignment.

The techniques of this disclosure potentially address some of the problems introduced above. While HyGT may be very efficient in reducing the amount of memory required to store multiple transforms and may provide a good degree of parallelization, the techniques utilize multiple repetitions of a transform round (as exemplified in FIG. 8) to achieve best results, and these multiple repetitions require numerous sequential calculations that cannot be performed in parallel. The complete transform is implemented as shown in FIG. 9. An explanation regarding how HyGT may be efficient in reducing the amount of memory required to store multiple transforms is described in A. Said, X. Zhao, M. Karczewicz, H. E. Egilmez, V. Seregin and J. Chen, "Highly efficient non-separable transforms for next generation video coding," *Proc. 32nd Picture Coding Symposium*, Nuremberg, Germany, December 2016.

Even though computations in a single pass can be done in parallel, each pass needs to be computed sequentially, which adds to the transform's computation latency. The techniques described below potentially solve some of the latency problems by using small matrices as the basic computational element, instead of the Givens "butterfly" elements (which mathematically are equivalent to multiplication by 2×2 matrices).

The second problem addressed by this disclosure is the fact that to reduce latency, by using matrices and minimizing the number of passes, more flexibility in the choice of inter-pass permutations (as in the case shown of FIG. 7) needs to be allowed for. However, allowing any type of permutation results in considerable costs in terms of transform-representation memory and hardware. This disclosure describes techniques that potentially solve the problem by instead using operand assignments constrained to a very specific subset, which can be represented with much less memory, and implemented more efficiently.

The techniques of this disclosure include performing transform computation via a series of operand assignment and parallel matrix passes. The techniques of this disclosure preserve the concept of implementing a transform using multiple passes over the data being transformed, but may reduce latency by having more computations done in parallel at each pass, so that the same compression efficiency can be obtained with a smaller number of passes.

Figure 10:
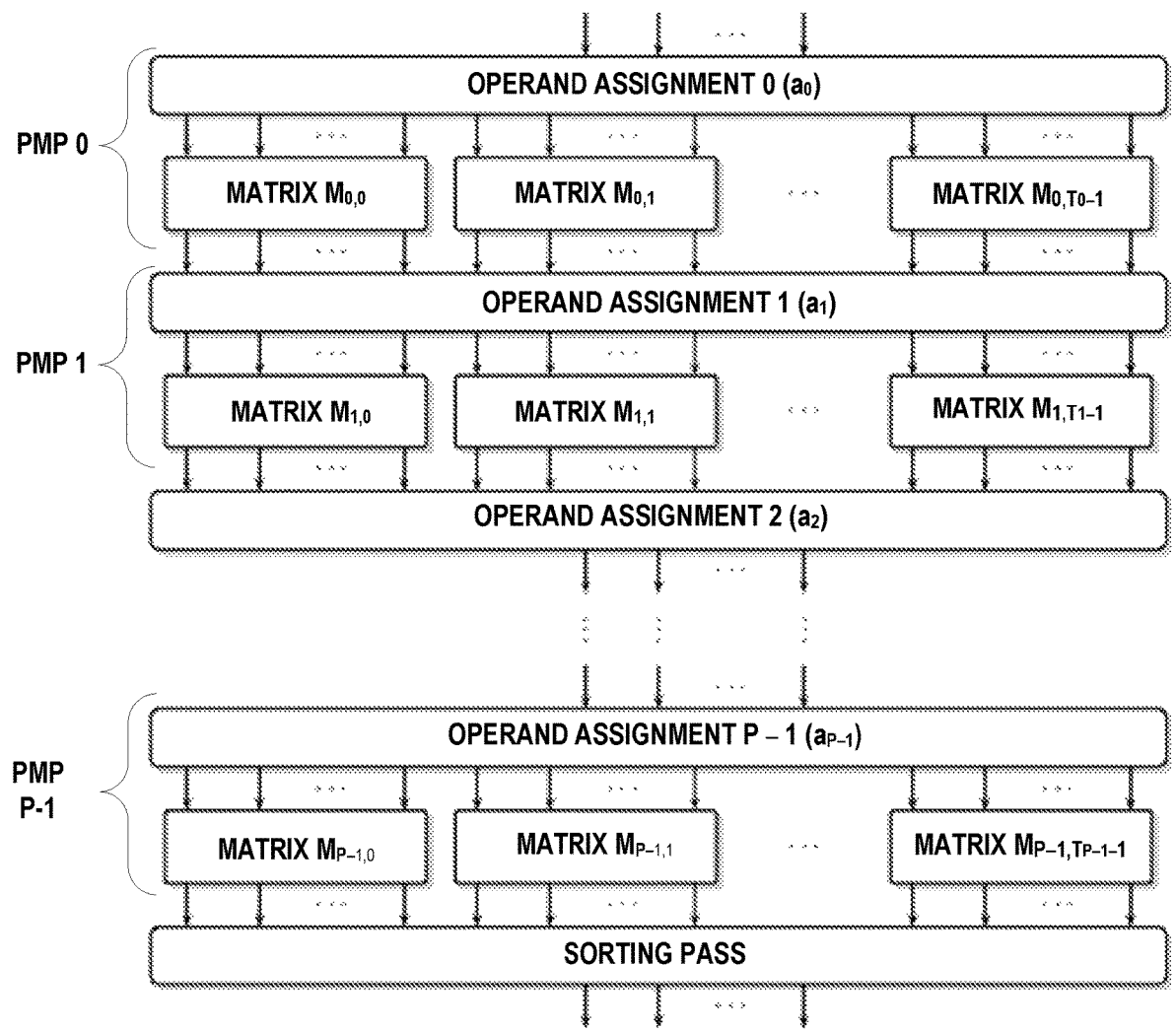
FIG. 10 shows an example of a general form of a transform that uses a series of Operand Assignment+Parallel Matrix (OA+PM) passes, according to techniques of this disclosure.

FIG. 10 shows an example of a general form of a new transform that uses a series of Operand Assignment+Parallel Matrix (OA+PM) passes. Differently from the schemes of FIGS. 7 and 8, where the basic computation element is defined by a Givens rotation ("butterfly"), for some techniques of this disclosure, the fundamental computation elements are orthogonal matrices, as shown in FIG. 10. An orthogonal matrix is a square matrix whose columns and rows are orthogonal unit vectors, where "unit" means Euclidean measure (sum of squares) equal to 1.

Those matrices are organized in such a way that enables two forms of parallelism:
- In a matrix pass, all the vector-matrix products can be computed in parallel.
- Each vector-matrix product can be computed with specialized hardware, possibly in a single clock cycle.

At the end of the transform computation there is an optional final stage corresponding to copying results back to some data structure, possibly sorting them to obtain increasing or decreasing variance. For coding, the transform coefficients are quantized and then entropy coded. The entropy coding can be more efficient if coefficients are sorted to exploit that property. For instance, if decreasing order is chosen, then magnitudes are expected to decrease, so after coding one coefficient, it is more probable that the next coefficient will be of smaller magnitude (signs are more or less independent).

Figure 12:
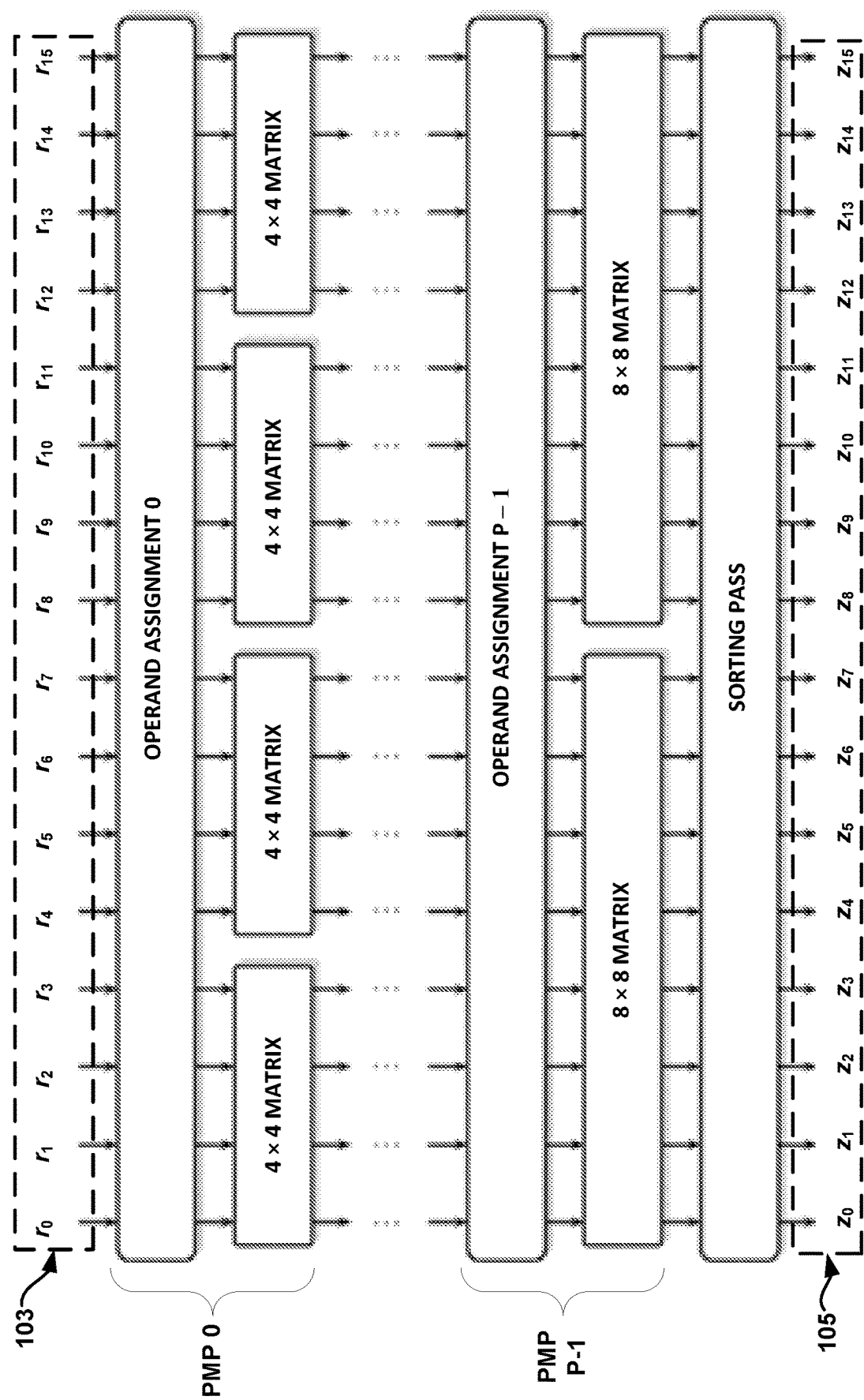
FIG. 12 shows an example of an implementation of the techniques of this disclosure applied to vectors of 16 dimensions, using matrices of different dimensions in different passes, according to techniques of this disclosure.

The operand assignments at each pass corresponds to the process of using assignment sequences, discussed in more detail below, which define the sets of vectors that are the operands of the matrix-vector products, as shown in FIG. 12. The assignment sequence assigns the input values to vectors (e.g., column vectors), and the vectors are multiplied by the matrices. In software/hardware, this can be implemented by modifying the indexes of array elements, or by copying operands to local buffers.

Figure 11:
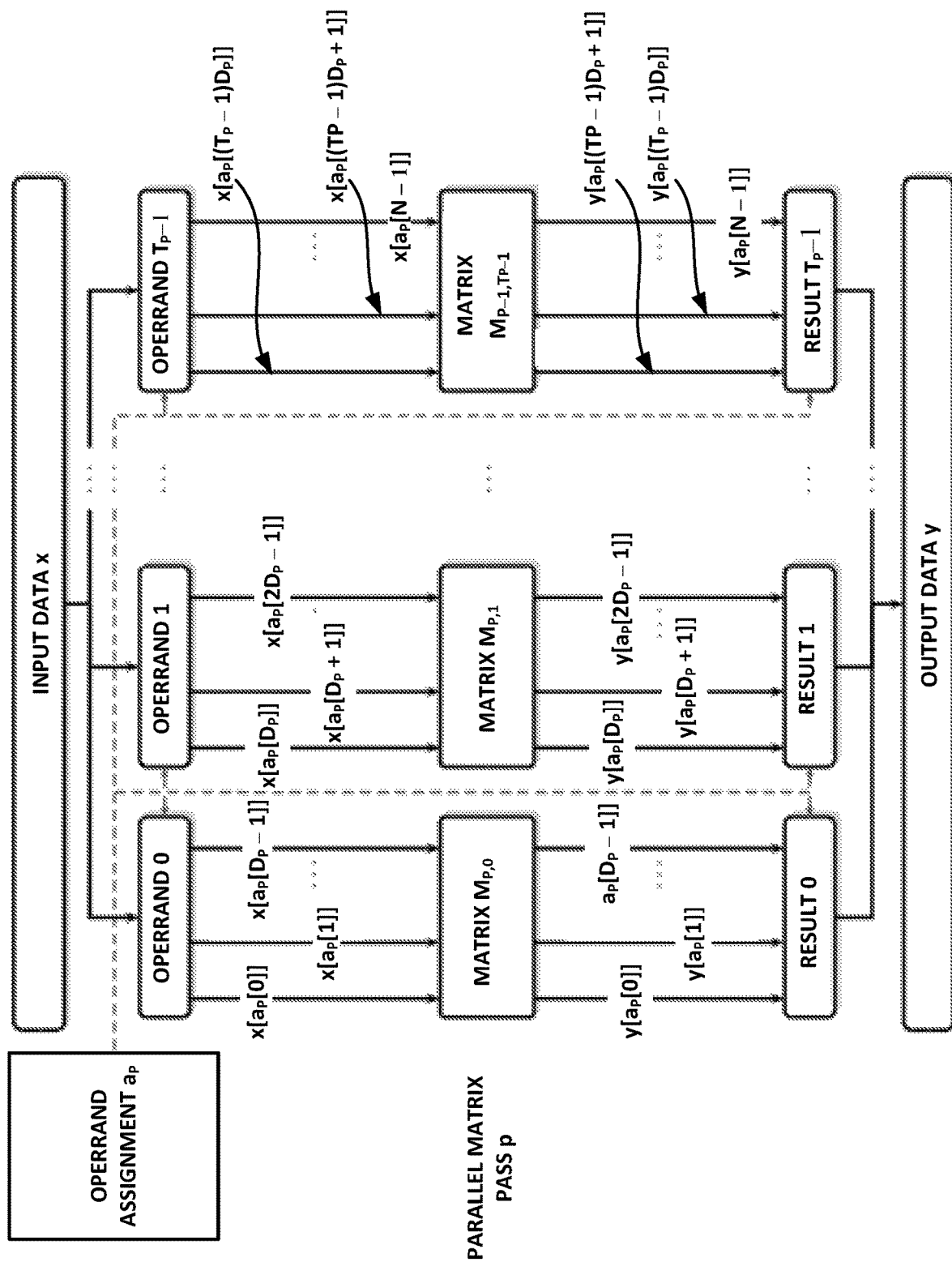
FIG. 11 shows an example of the operand assignment process, according to techniques of this disclosure.

FIG. 11 shows an example of the operand assignment process: Intermediary transform computation results are indexed (or copied to local buffers) to form the operands of the matrix-vector products. The notation used in FIG. 11 corresponds to the assumption that, at parallel matrix pass p, a set of $T_p$ matrices all have dimension equal to $D_p$. Note that in general there are no constraints on the dimensions of the matrices in each pass. For example, FIG. 12 shows how a transform of dimension 16 can be computed using matrices of dimensions 4 and 8 in different passes. In this disclosure, it is assumed that all matrices in a pass have the same dimension for the purposes of simplifying notation.

FIG. 12 shows an example of an implementation of the techniques of this disclosure applied to vectors of dimension 16, using matrices of different dimensions in different passes. In the example of FIG. 12, residual data 103 is transformed into transform coefficients 105.

Aspects of permutation and operand assignment sequences will now be described. First, the notation and definitions required to formally define the operations in FIG. 11 will now be described. The permutation of an N-dimensional vector x into vector y is commonly represented using matrix notation, as $$y = Rx,$$

where R is a permutation matrix, i.e., a matrix with only elements 0 or 1, and with all row and column sums equal to 1.

A more convenient notation may be to represent the transform data with arrays indexed using square brackets. Thus, the permutation matrix can be replaced with a permutation sequence r[n] such that, for n=0, 1, ..., N-1:

$$r[n] \in \{0,1,2,\ldots,N-1\}; r[n] \neq r[n-m], m=1,2,\ldots,n.$$

and the permutation operation is defined by the equation $$y[n]=x[r[n]], n=0,1,2,\ldots,N-1,$$

In addition, the inverse permutation sequence $r^{-1}[n]$ can be defined as a unique permutation sequence satisfying $$r^{-1}[r[n]]=n, n=0,1,2,\ldots,N-1.$$

Given a transform of dimension N, at each matrix pass, there are integer factors $D_p$ and $T_p$, representing respectively matrix dimension and number of matrices, such that $D_p T_p = N$. All the possible operand assignments can be enumerated by using permutation sequences, and simply splitting its elements into $T_p$ partitions of $D_p$ elements.

However, such an arrangement may be highly redundant because matrices are orthogonal, and thus can implement any permutation of dimension $D_p$. This means that only one of those $D_p!$ assignments per partition is needed. Similarly, the $T_p!$ permutations of the partitions themselves are also redundant, due to the presence of the final sorting pass.

This means that, while the total number of assignments is equal to the number of permutations N!, the number of non-redundant operand assignments for the transform application is:

$$\frac{N!}{T_p!(D_p!)^{T_p}}.$$

The redundant assignments can be eliminated by defining additional conditions to be satisfied by the permutation sequences. Since those conditions are not unique, in some examples, two sets can be selected and for each pass p can define an assignment sequence $a_p[n]$, as a permutation sequence that also satisfies the following conditions $$a_p[kD_p + n - 1] < a_p[kD_p + n], n = 1, 2, \ldots, D_p - 1, \quad (6)$$
$$k = 1, 2, \ldots, T_p - 1,$$

$$\sum_{n=0}^{D_p-1} a_p[(k-1)D_p + n]N^n < \sum_{n=0}^{D_p-1} a_p[kD_p + n]N^n, \quad (7)$$
$$k = 1, 2, \ldots, T_p - 1.$$

Figure 13:
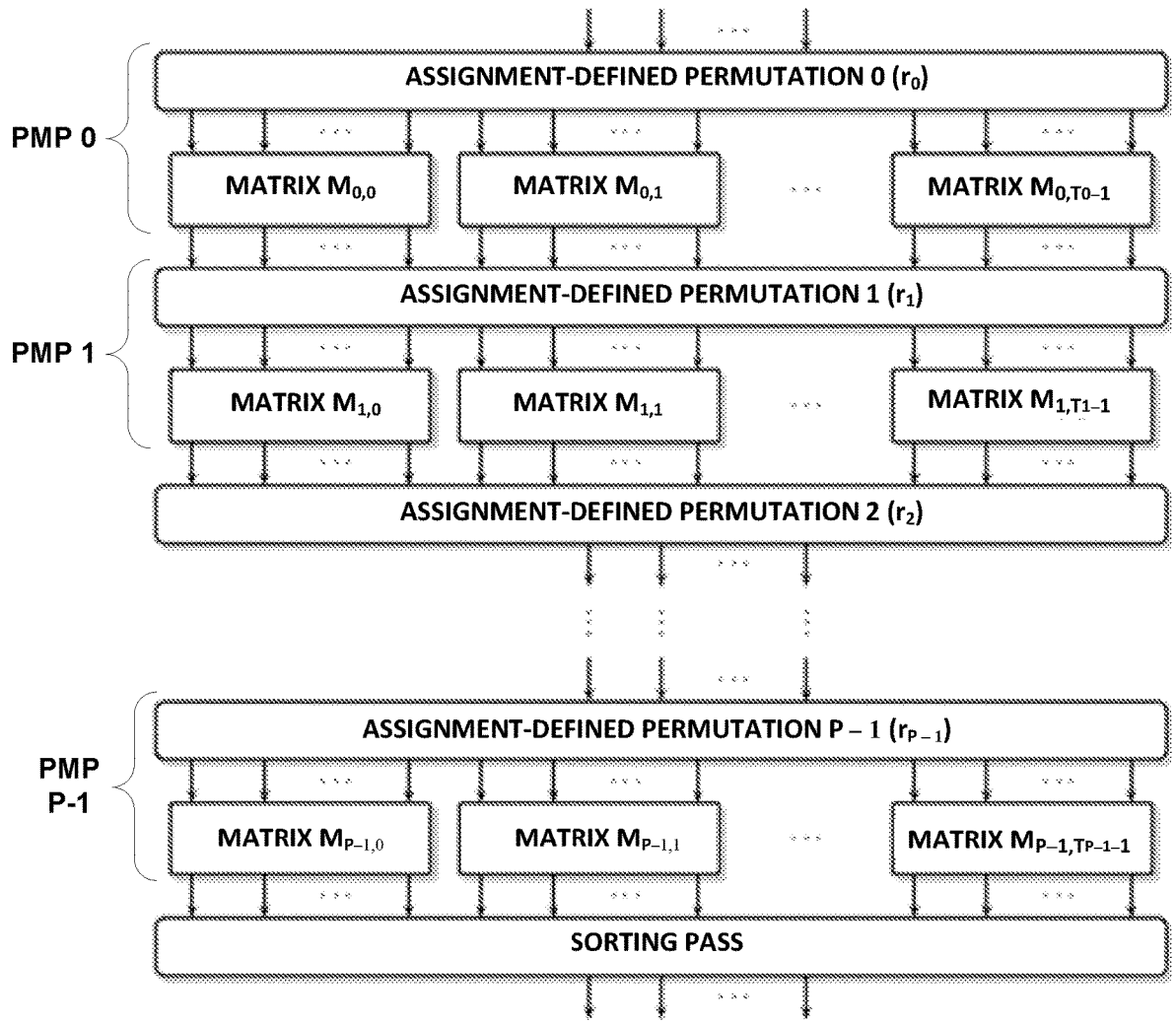
FIG. 13 shows an example implementation of the transform computation system, with assignment-defined permutations replacing the operand assignments, according to techniques of this disclosure.

FIG. 13 shows an example implementation of the transform computation system, with assignment-defined permutations replacing the operand assignments. Operand assignments can be considered mathematically equivalent to permutations, since if from a sequence of P operand assignments $\{a_0, a_1, \ldots, a_{P-1}\}$ the sequence of P assignment-defined permutations are defined as:

$$r_0[n]=a_0[n], r_p[n]=a_{p-1}^{-1}[a_p[n]], p=1,2,\ldots,P-1, n=0,$$
$$1,\ldots,N-1, \quad (8)$$

and use those permutations in the system of FIG. 13 (and same matrices), then exactly the same transform computations as those obtained using the system of FIG. 10 are obtained.

However, as explained above explained above with respect to the different implementation types, there are important practical differences between the two implementations, related to the need to move data between memory positions. Furthermore, it is easier to define the minimal sets of assignments (i.e., eliminate those that are redundant for transform applications using equations (6) and (7)), than to define minimal sets of permutations. This is further explored in the next section.

Index Bit Order (IBO) permutations will now be described. Table I shows the number of permutations for some practical values of transform dimension N, and matrix dimension D (assuming all matrices in a pass have same dimension). It can be observed, in the third and fourth columns of Table I, that for the general case the number of possible permutations is much larger than the number of operand assignments.

K), the corresponding Index Bit Order (IBO) operand assignment can be defined as:

$$b_o[n] = \sum_{i=0}^{K-1} 2^i C[i, n] = \sum_{i=0}^{K-1} 2^{o[i]} B[i, n], \quad (9)$$

$$n = 0, 1, 2, \ldots, 2^K - 1.$$

TABLE I

Number of permutation and assignment sequences for different transform dimensions (N) and matrix dimensions (D).

|   |   | General | | Index bit order | | | |
|---|---|---|---|---|---|---|---|
| N | D | Permut. | Oprd. assign. | Permut. | Oprd. assign. | Oprd. assign. + inverse | Oprd. assign. × inverse |
| 8 | 2 | 40,320 | 1,050 | 6 | 3 | 4 | 5 |
| 8 | 4 | 40,320 | 35 | 6 | 3 | 4 | 5 |
| 16 | 2 | 2 × 10$^{13}$ | 2 × 10$^6$ | 24 | 4 | 6 | 10 |
| 16 | 4 | 2 × 10$^{13}$ | 3 × 10$^6$ | 24 | 6 | 9 | 16 |
| 16 | 8 | 2 × 10$^{13}$ | 6435 | 24 | 4 | 6 | 10 |
| 32 | 2 | 3 × 10$^{35}$ | 2 × 10$^{17}$ | 120 | 5 | 8 | 17 |
| 32 | 4 | 3 × 10$^{35}$ | 6 × 10$^{19}$ | 120 | 10 | 17 | 40 |
| 32 | 8 | 3 × 10$^{35}$ | 4 × 10$^{15}$ | 120 | 10 | 17 | 40 |
| 32 | 16 | 3 × 10$^{35}$ | 3 × 10$^8$ | 120 | 5 | 8 | 17 |
| 64 | 2 | 1 × 10$^{89}$ | 1 × 10$^{44}$ | 720 | 6 | 10 | 26 |
| 64 | 4 | 1 × 10$^{89}$ | 5 × 10$^{53}$ | 720 | 15 | 27 | 89 |
| 64 | 8 | 1 × 10$^{89}$ | 5 × 10$^{47}$ | 720 | 20 | 36 | 128 |
| 64 | 16 | 1 × 10$^{89}$ | 3 × 10$^{34}$ | 720 | 15 | 27 | 89 |
| 64 | 32 | 1 × 10$^{89}$ | 9 × 10$^{17}$ | 720 | 6 | 10 | 26 |

Nevertheless, those numbers can still be extraordinarily large. This means that, for common values of N, the most practical way to represent permutations is to use (at least) log$_2$(N)×N bits to store all the permutation indexes (i.e., represent each r[n] with log$_2$(N) bits, for n=0, 1, . . . , N−1). Operand assignments would need about half the number of bits, but in a more complicated representation.

However, for transform coding in video compression only a very small number of operand assignments are truly useful and make practical sense, and the same coding results can be obtained using only operand assignments belonging to certain carefully selected sets. In other words, the conditions imposed by equations (6) and (7) eliminate the cases that are truly redundant, but there may still exist a need for an additional technique to eliminate the cases that are not redundant but are inefficient.

Since for video compression the transforms commonly have dimensions that are powers of two, the second technique used in this disclosure, to select only the permutations that are useful for the transform factorization, is based on the binary representation of transform coefficient indexes, which is defined by the unique two-dimensional array B[i,n] satisfying conditions:

$$n = \sum_{i=0}^{K-1} 2^i B[i, n]; B[i, n] \in \{0, 1\}, i = 0, 1, \ldots, K - 1,$$

$$n = 0, 1, \ldots, 2^K - 1.$$

Given a bit order sequence o[i] of the K=log$_2$(N) binary symbols of an index n (a permutation sequence of dimension FIG. 17 shows a table that illustrates an example of how a permutation of index bits is used to generate an operand assignment sequence, for dimensions N=8 and K=3. The table of FIG. 17 shows an example, for transform dimension N=8, of how a permutation of binary symbols defines a complete permutation. In that example, o[0]=2, o[1]=0, and o[2]=1.

Since the number of possible bit order sequences o[i] is K!, the amount of memory required to represent the IBO operand assignment sequence b$_o$[n] is at most K×⌈log$_2$(K)⌉ bits. In addition, even greater reductions are possible by eliminating redundant operand assignments using conditions defined by equations (6) and (7). For IBO operand assignments, with G$_p$=log$_2$(D$_p$), those conditions can be replaced respectively with $$o_p[i-1] < o_p[i], i=1,2, \ldots, G_p-1, \quad (10)$$

$$o_p[i-1] < o_p[i], i=G_p+1, G_p+2 \ldots, K-1. \quad (11)$$

Figure 14:
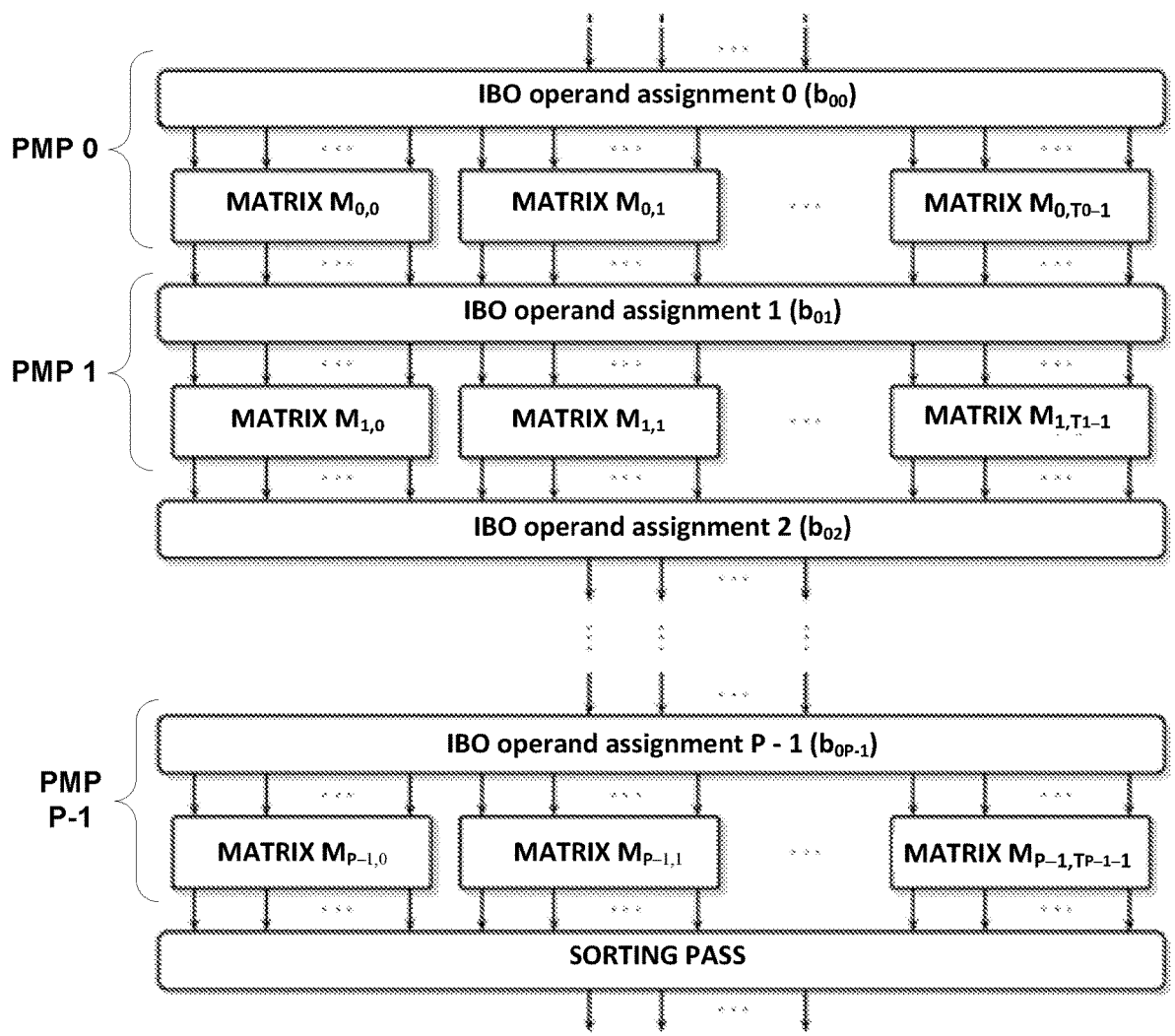
FIG. 14 shows an example transform implementation of FIG. 10, using the special class of Index Bit Order (IBO) operand assignments, according to techniques of this disclosure.

FIG. 14 shows an example transform implementation of FIG. 10, using the special class of IBO operand assignments.

The sixth column of Table I shows the number of IBO operand assignments, i.e., how many bit order sequences satisfy conditions (5) and (6), for typical values of N and D. It can be observed that those numbers are significantly smaller than K!, and consequently each assignment can be identified with only a few bits.

For implementations using permutations instead of operand assignments, the fact that bit order sequences are isomorphic to their corresponding permutation sequences can be exploited, i.e., if u[i] and v[i] are permutation sequences of dimension K, thus:

$$o[i]=u[v[i]], i=0,1, \ldots, K-1, \Rightarrow b_o[n]=b_u[b_v[n]], n=0, 1, \ldots 2^K-1.$$

Figure 15:
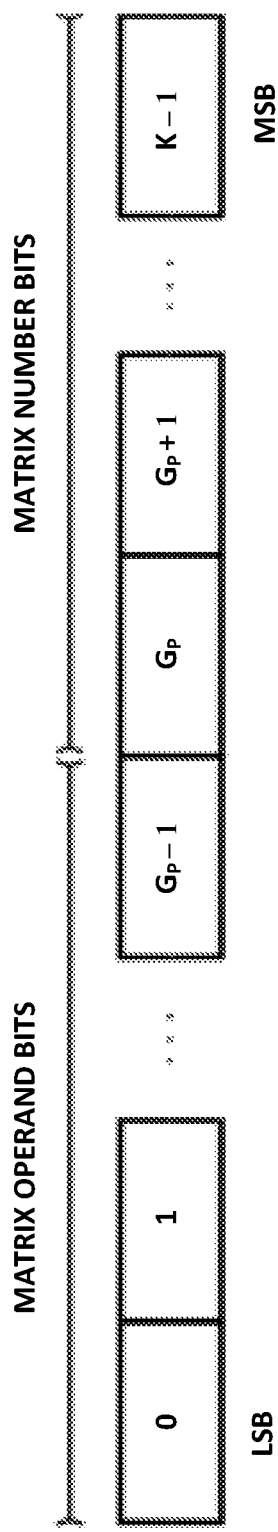
FIG. 15 shows an example meaning of bits used in the index of transform computation results, according to techniques of this disclosure.

FIG. 15 shows an example meaning of bits used in the index of transform computation results. When using equation (8) to compute permutation sequences from IBO operand assignments, IBO sequences are again obtained. However, those permutations do not necessary satisfy the conditions of equations (6) and (7), even if the operand assignment sequences do.

The last two columns of Table I show the number of different permutations needed to replace IBO operand assignments using equation (8). The next to last column corresponds to cases when a sequence and its inverse are done separately and sequentially, and the last column to the cases when the composition of two permutations is implemented as a single permutation. Note that those numbers of permutations are larger than the numbers of operand assignments, justifying the use of the latter as a representation with the minimum number of cases.

Aspects of Inter-pass constraints will now be described. Having the same operand assignments in two consecutive parallel matrix passes corresponds to having the same vectors consecutively multiplied by matrices, in the form $$y = M_{p,k} M_{p+1,k} x$$

Since the product of two orthogonal matrices is also an orthogonal matrix, this means that the two matrix vector multiplications can be replaced by a single one, and the computations in the second pass are completely redundant. This can be avoided by simply requiring $$a_{p-1} \neq o_p, \; p=1,2,\ldots,P-1,$$

or, for IBO operand assignments, $$o_{p-1} \neq o_p, \; p=1,2,\ldots,P-1. \quad (12)$$

While this case may be inefficient, there are also other cases when the overlap in computations is not complete, but large enough to degrade performance. For IBO operand assignments, those cases can be detected by counting, in the compound bit order sequence, the number of the index bits that remain assigned to represent operand indexes (as shown in FIG. 15). This can be done according to equation $$\sum_{i=0}^{G_p-1} \delta[o_{p-1}^{-1}[o_p[i]], G_p] < G_p - \alpha, \; p=1,2,\ldots,P-1,.$$

where $\alpha$ is a non-negative integer, and $$\delta[m,n] = \begin{cases} 1, & m < n, \\ 0, & \text{otherwise} \end{cases}.$$

The case $\alpha=0$ corresponds to the constraints of equation (12), and larger values can be chosen to further constrain the transitions in operand assignments.

Modification for Hierarchical Transforms will now be described. For applications such as video coding, there are transform components that need to be computed more precisely to achieve best compression, while other components can be roughly approximated without degrading compression. This translates in different computation requirements, with some components requiring less processing than others.

Figure 16:
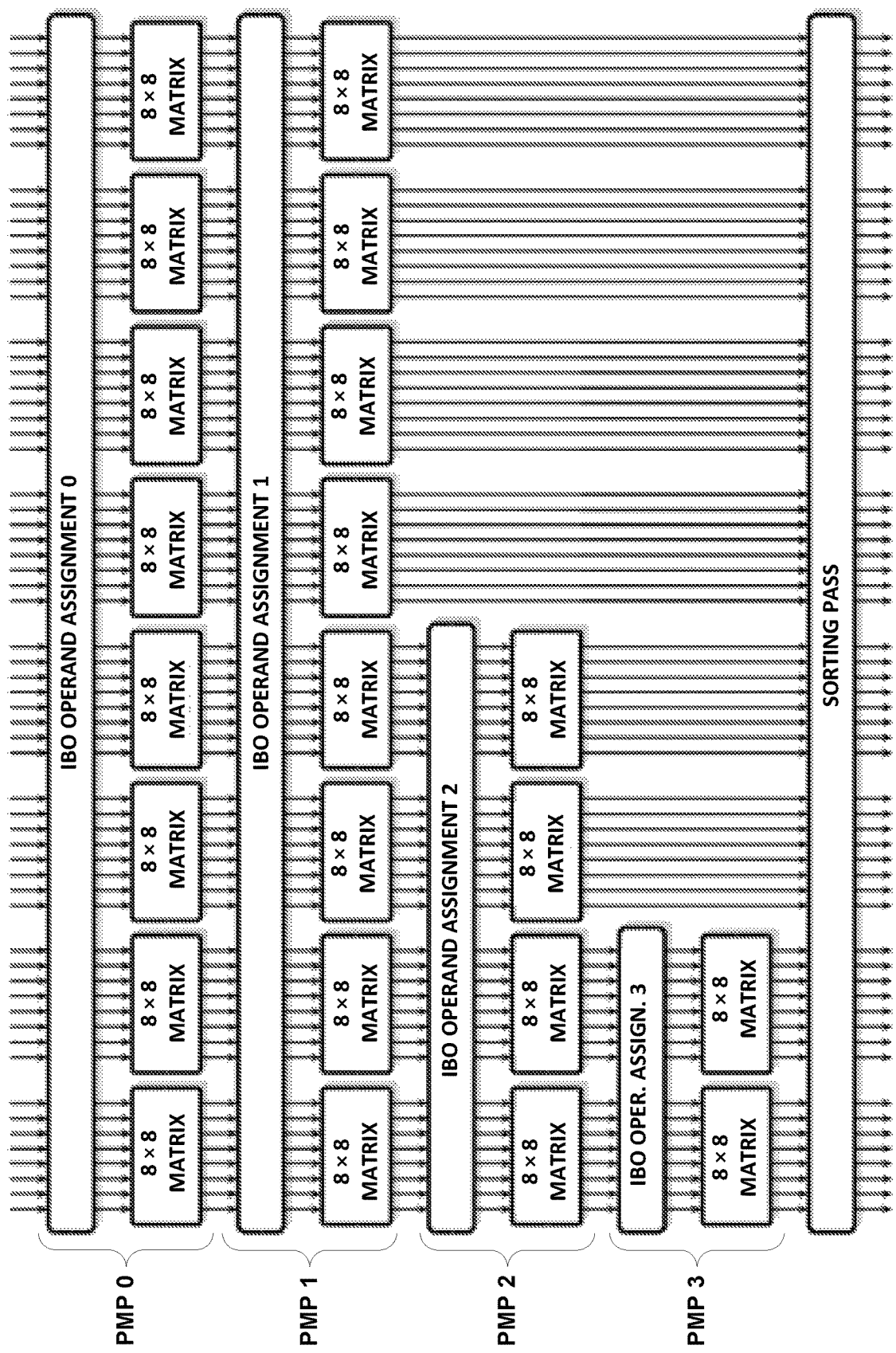
FIG. 16 shows an example of an implementation of a hierarchical transform using IBO operand assignments and parallel matrix passes, while using only 8×8 matrices, and having a variable number of matrices in each pass, according to techniques of this disclosure.

This can be achieved using parallel matrix and operand assignment passes, similarly to the scheme of FIG. 10, but having different numbers of matrices in a pass, omitting the matrices that correspond to the identity. FIG. 16 shows an example of such a hierarchical transform, on vectors of dimension 64. That is, FIG. 16 shows an example of an implementation of a hierarchical transform using IBO operand assignments and parallel matrix passes, while using only 8×8 matrices, and having a variable number of matrices in each pass.

Aspects of flexible integer arithmetic implementations will now be described. Since the transforms employed for video compression are used together with predictive coding, the transforms use integer arithmetic and well-defined truncations to avoid error propagation. In all the transform computation systems presented in this document, it is straightforward to convert the matrix coefficients to integer values corresponding to fixed-point numerical representation, followed by truncation of the matrix-vector result.

One important feature of the multi-pass implementation is the fact that if the truncations are not implemented at the end of a pass, and if arithmetic is done with enough bits to avoid overflow, then it is possible to combine two passes into a single pass, which has larger matrices, with dimension depending on the operand assignments and matrices of the combined passes.

This feature is useful to allow flexibility in the implementation of the transform, allowing the designers to choose between more passes with smaller matrices (simpler hardware, but larger latency), or a smaller number of passes and larger matrices (more expensive hardware, but lower latency).

Figure 18:
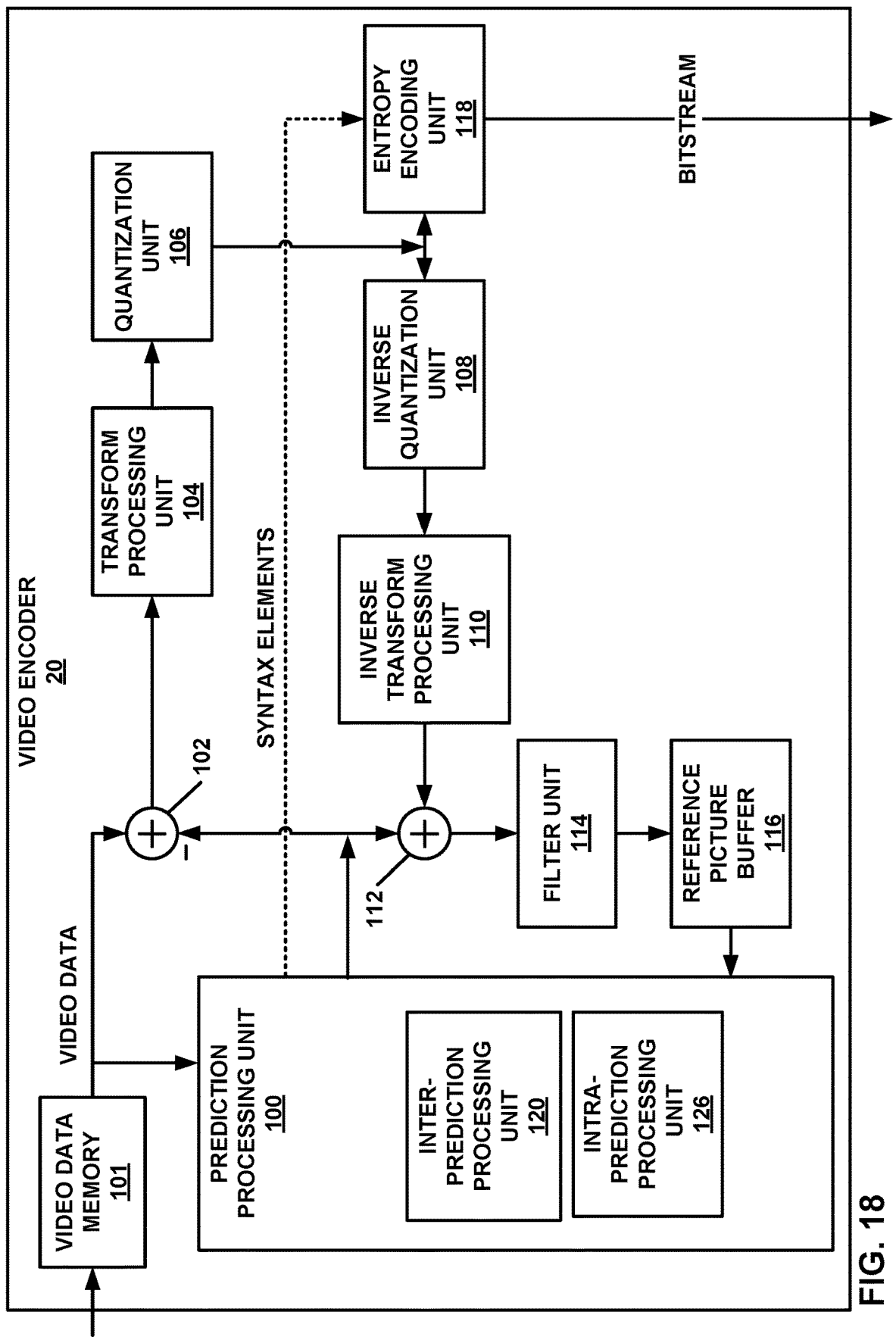
FIG. 18 is a block diagram illustrating an example of a video encoder.

FIG. 18 is a block diagram illustrating an example video encoder 20 that may implement the techniques of this disclosure. FIG. 18 is provided for purposes of explanation and should not be considered limiting of the techniques as broadly exemplified and described in this disclosure. The techniques of this disclosure may be applicable to various coding standards or methods.

Processing circuitry includes video encoder 20, and video encoder 20 is configured to perform one or more of the example techniques described in this disclosure. For instance, video encoder 20 includes integrated circuitry, and the various units illustrated in FIG. 18 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 18 may be software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques or has software/firmware executing on the hardware to specialize the hardware to perform the example techniques.

In the example of FIG. 18, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a reference picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 20. The video data stored in video data memory 101 may be obtained, for example, from video source 18. Reference picture buffer 116 may be also be referred to as a decoded picture buffer. Reference picture buffer 116 stores reference video data for use in encoding video data by video encoder 20, e.g., in intra- or inter-coding modes. Video data memory 101 and reference picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and reference picture buffer 116 may be provided by the same memory device or separate memory devices. In various examples, video data memory 101 may be on-chip with other components of video encoder 20, or off-chip relative to those components. Video data memory 101 may be the same as or part of storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Inverse quantization may restore the bit depths of transform coefficients. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Reference picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in reference picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In this regard, video encoder 20 represents an example of a device for encoding video data that includes a memory configured to store video and one or more processors configured to decode the video data. Video encoder 20 may, for example, determine, for a current block of the video data, residual data that represents pixel differences between the current block of the video data and a predictive block of the video data. Video encoder 20, e.g., transform processing unit 104, may perform a multi-pass non-separable transformation on the residual data to generate a plurality of values. To perform a pass of the multi-pass transformation, transform processing unit 104 may determine at least two matrices, wherein the at least two matrices comprise a first matrix and a second matrix; determine at least two vectors, wherein the at least two vectors comprise a first vector and a second vector; and perform at least two matrix-vector computations, with the at least two matrix-vector computations being a first matrix-vector computation based on the first matrix and the first vector and a second matrix-vector computation based on the second matrix and the second vector. Video encoder 20 may encode, in an encoded video bitstream, syntax elements that represent the plurality of values.

Video encoder 20 also represents an example of a device for decoding video data that includes a memory configured to store video and one or more processors configured to decode the video data. Video encoder 20 may, for example, decode video data in order to determine reference pictures to be used for encoding and to test various encoding hypotheses as part of determining how to encode video data. Inverse transform processing unit 110 may, for example, perform a multi-pass inverse transformation on the plurality of values to derive residual data that represents pixel differences between the current block of the video data and a predictive block of the video data. To perform a pass of the multi-pass inverse transformation, inverse transform processing unit 110 may determine at least two matrices, wherein the at least two matrices comprise a first matrix and a second matrix; and determine at least two vectors, wherein the at least two vectors comprise a first vector and a second vector; and perform at least two matrix-vector computations, wherein the at least two matrix-vector computations comprise a first matrix-vector computation based on the first matrix and the first vector and a second matrix-vector computation based on the second matrix and the second vector. Video encoder 20, e.g., reconstruction unit 112, may reconstruct the current block of the video data based on the residual data and the predictive block of the video data.

Figure 19:
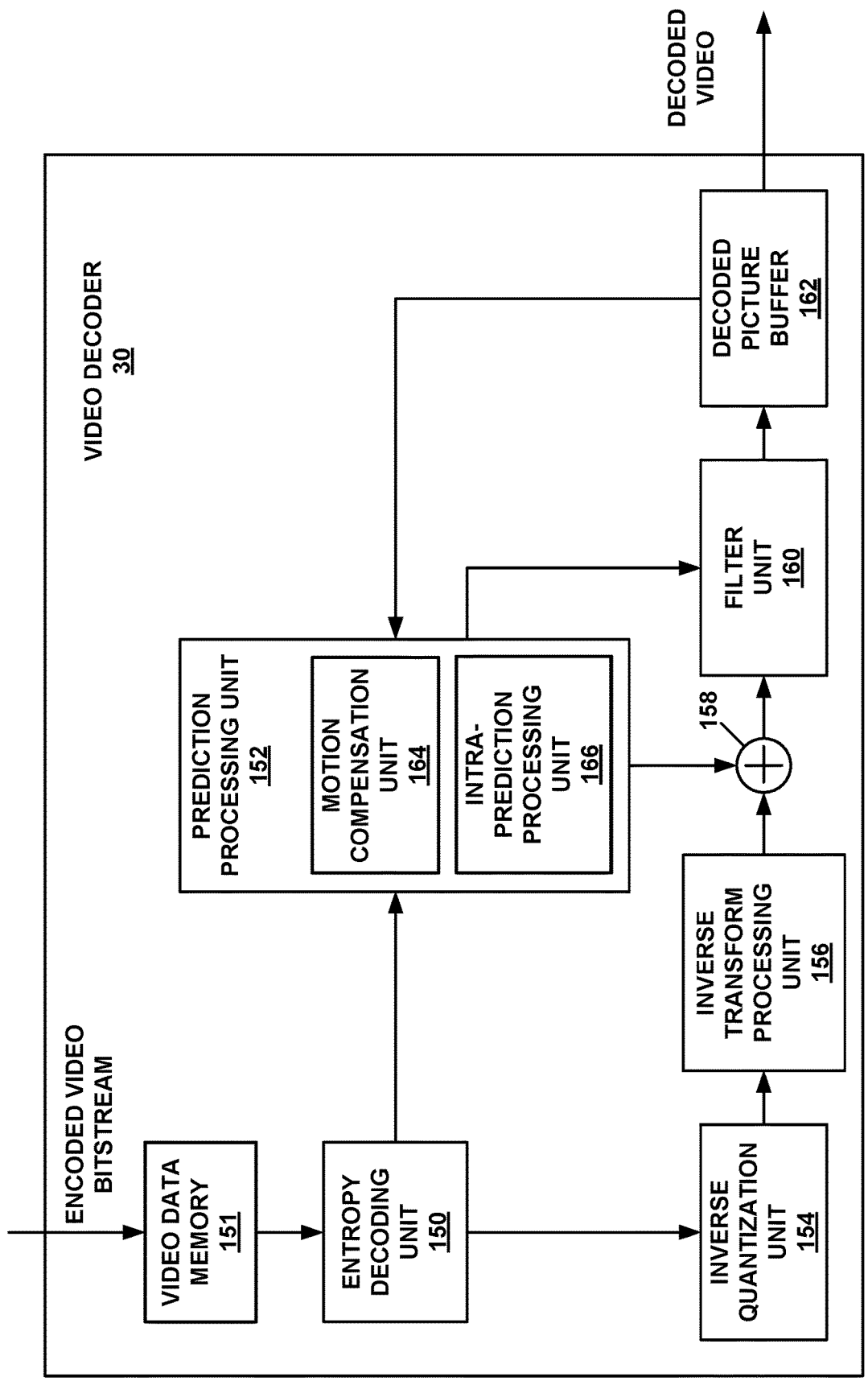
FIG. 19 is a block diagram illustrating an example of a video decoder.

FIG. 19 is a block diagram illustrating an example video decoder 30 that is configured to implement the techniques of this disclosure. FIG. 19 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Processing circuitry includes video decoder 30, and video decoder 30 is configured to perform one or more of the example techniques described in this disclosure. For instance, video decoder 30 includes integrated circuitry, and the various units illustrated in FIG. 19 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 19 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

In the example of FIG. 19, video decoder 30 includes an entropy decoding unit 150, video data memory 151, a prediction processing unit 152, an inverse quantization unit 154, an inverse transform processing unit 156, a reconstruction unit 158, a filter unit 160, and a reference picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Reference picture buffer 162 may also be referred to as a reference picture memory. Reference picture buffer 162 stores reference video data for use in decoding video data by video decoder 30, e.g., in intra- or inter-coding modes, or for output. Video data memory 151 and reference picture buffer 162 may be formed by any of a variety of memory devices, such as DRAM, including SDRAM, MRAM, RRAM, or other types of memory devices. Video data memory 151 and reference picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

In accordance with the techniques of this disclosure, inverse transform processing unit 156 may be configured to determine, based on syntax elements in an encoded video bitstream, a plurality of values for a current block of the video data and perform a multi-pass inverse transformation on the plurality of values to derive residual data that represents pixel differences between the current block of the video data and a predictive block of the video data. To perform a pass of the multi-pass inverse transformation, inverse transform processing unit 156 may determine at least two matrices that include a first matrix and a second matrix; determine at least two vectors (e.g., at least two vector operands) that include a first vector and a second vector; and perform at least two matrix-vector computations that include a first matrix-vector computation based on the first matrix and the first vector and a second matrix-vector computation based on the second matrix and the second vector.

The matrices used for inverse transforming by video decoder 30 may be inverses matrices of the matrices used for transforming by video encoder 20. If the matrices are orthogonal, then the inverse may be the transpose. For integer arithmetic, the inverse transformation may be done by reversing the steps (matrix computations and operand assignment), in the inverse order, performed by video encoder 20. For instance, of forward transformation is $A1 \rightarrow T1 \rightarrow A2 \rightarrow T2$, the inverse may be computed as $T2^{\wedge}(-1) \rightarrow A2^{\wedge}(-1) \rightarrow T1^{\wedge}(-1) \rightarrow A1^{\wedge}(-1)$.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in reference picture buffer 162. Reference picture buffer 162 may provide reference pictures for subsequent motion compensation, intra prediction, and presentation on a display device, such as display device 32 of FIG. 1. For instance, video decoder 30 may perform, based on the blocks in reference picture buffer 162, intra prediction or inter prediction operations for PUs of other CUs.

Figure 20:
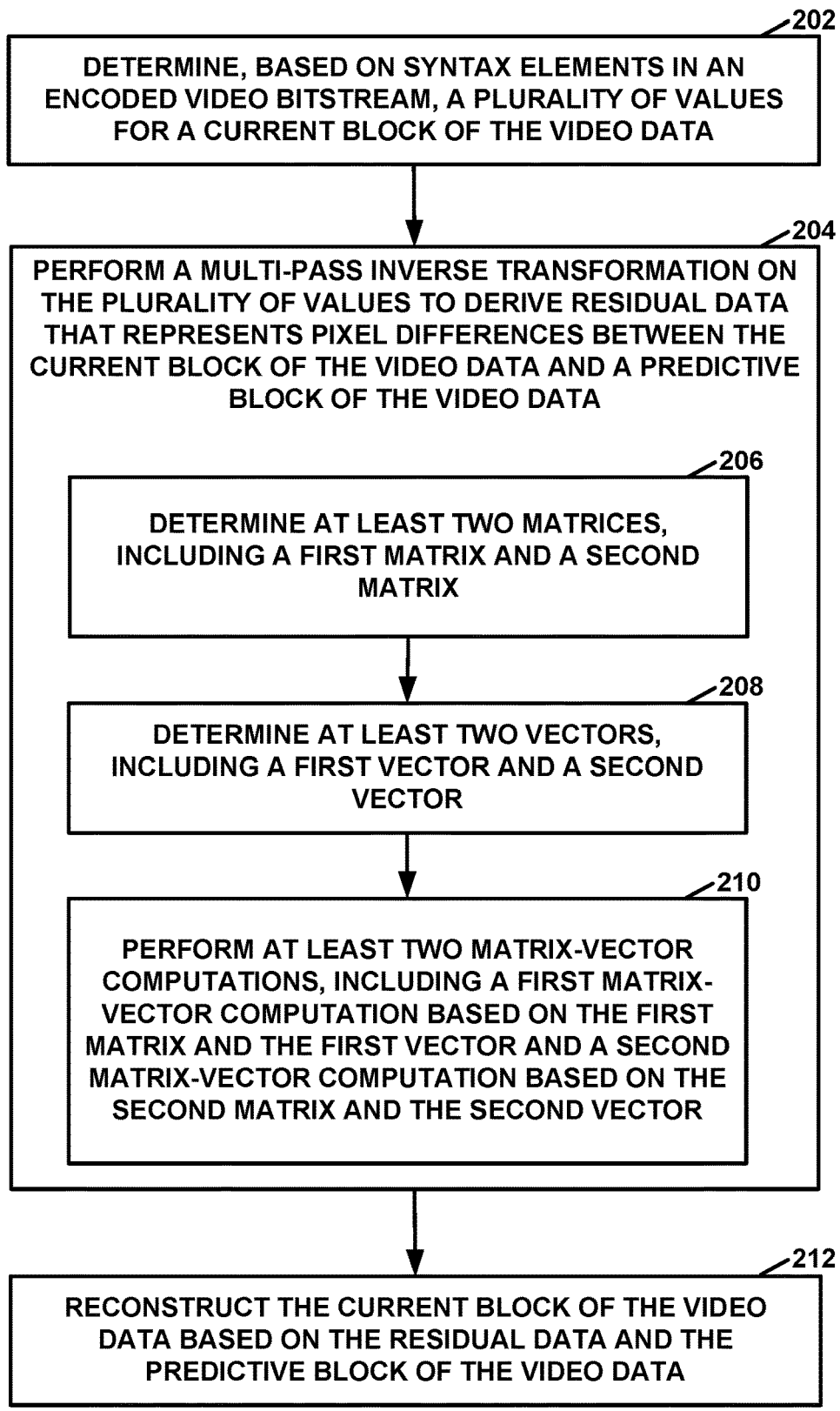
FIG. 20 is a flowchart illustrating an example operation of a video decoder for decoding video, according to techniques of this disclosure.

FIG. 20 is a flowchart illustrating an example operation of video decoder 30 for decoding video, in accordance with a technique of this disclosure. In the example of FIG. 20, video decoder 30 determines, based on syntax elements in an encoded video bitstream, a plurality of values for a current block of the video data (202). Video decoder 30 performs a multi-pass inverse transformation on the plurality of values to derive residual data that represents pixel differences between the current block of the video data and a predictive block of the video data (204). To perform a pass of the multi-pass inverse transformation, video decoder 30 determines at least two matrices, including a first matrix and a second matrix (206); determines at least two vectors, including a first vector and a second vector (208); and performs at least two matrix-vector computations, including a first matrix-vector computation based on the first matrix and the first vector and a second matrix-vector computation based on the second matrix and the second vector (210). Video decoder 30 reconstructs the current block of the video data based on the residual data and the predictive block of the video data (212).

Figure 21:
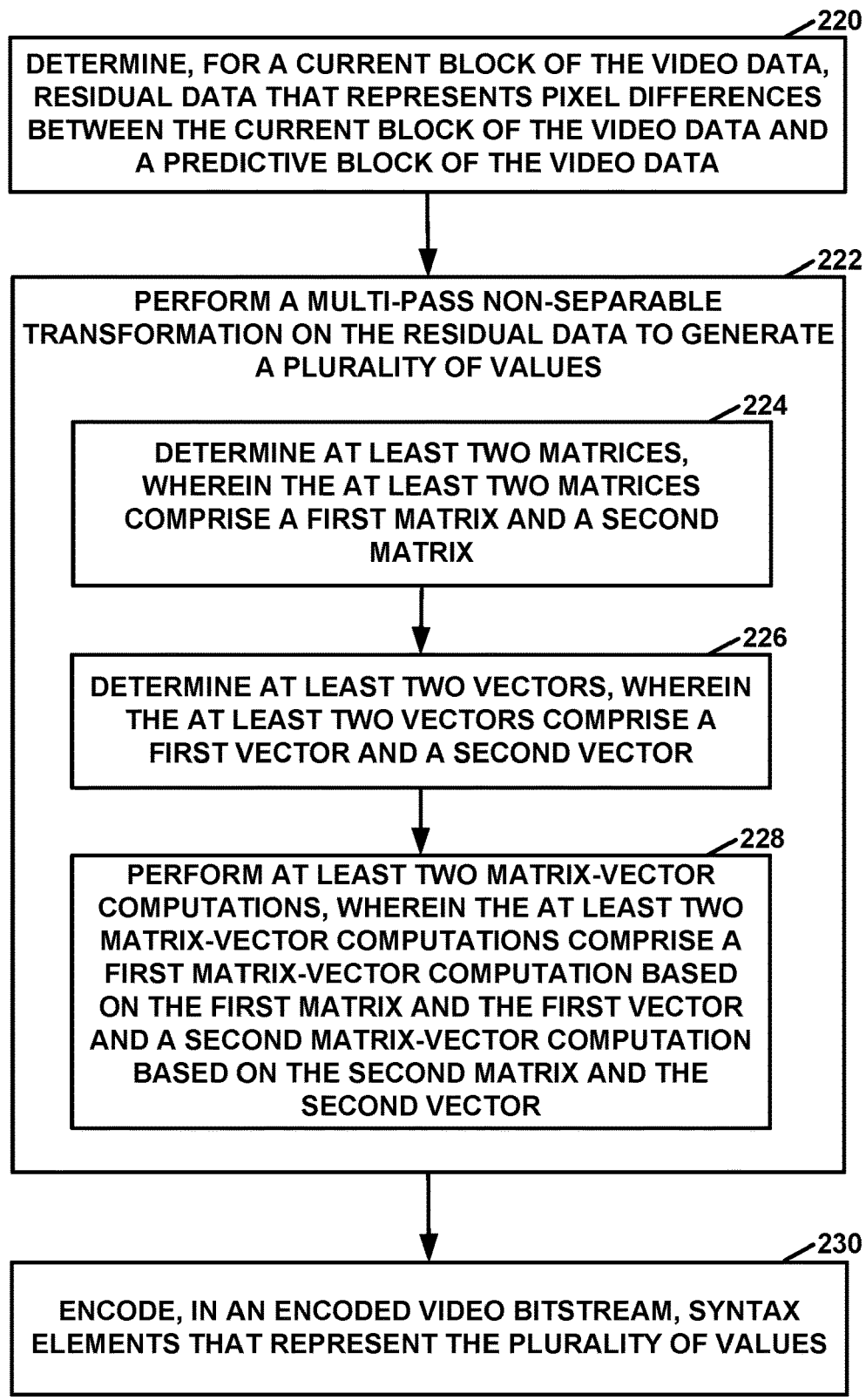
FIG. 21 is a flowchart illustrating an example operation of a video encoder for encoding video, according to techniques of this disclosure.

FIG. 21 is a flowchart illustrating an example operation of video encoder 20 for encoding video, in accordance with a technique of this disclosure. In the example of FIG. 21, video encoder 20 may determine, for a current block of the video data, residual data that represents pixel differences between the current block of the video data and a predictive block of the video data (220). Video encoder 20 performs a multi-pass non-separable transformation on the residual data to generate a plurality of values (222). To perform a multi-pass non-separable transformation on the residual data to generate a plurality of values, video encoder 20 determines at least two matrices, wherein the at least two matrices comprise a first matrix and a second matrix (224); determines at least two vectors, wherein the at least two vectors comprise a first vector and a second vector (226); and performs at least two matrix-vector computations, wherein the at least two matrix-vector computations comprise a first matrix-vector computation based on the first matrix and the first vector and a second matrix-vector computation based on the second matrix and the second vector (228). Video encoder 20 encodes, in an encoded video bitstream, syntax elements that represent the plurality of values (230).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Hence, a processor may be formed by any of a variety of integrated processing circuitry comprising one or more processors implemented as fixed hardware processing circuitry, programmable processing circuitry and/or a combination of both fixed and programmable processing circuitry.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
determining, by a video decoder and based on syntax elements in an encoded video bitstream, a plurality of values for a current block of the video data;
performing, by the video decoder, a multi-pass inverse transformation on the plurality of values to derive residual data that represents pixel differences between the current block of the video data and a predictive block of the video data, wherein performing a pass of the multi-pass inverse transformation comprises:
determining at least two matrices, wherein the at least two matrices comprise a first orthogonal matrix and a second orthogonal matrix;

determining at least two vectors, wherein the at least two vectors comprise a first vector and a second vector; and performing at least two matrix-vector computations in parallel during the pass, wherein the at least two matrix-vector computations performed in parallel during the pass comprise a first matrix-vector computation using the first orthogonal matrix and the first vector and a second matrix-vector computation using the second orthogonal matrix and the second vector; and reconstructing, by the video decoder, the current block of the video data based on the residual data and the predictive block of the video data.

2. The method of claim 1, wherein:

performing the pass of the multi-pass inverse transformation comprises performing an initial pass of the multi-pass inverse transformation;

determining the at least two vectors comprises determining the at least two vectors based on the plurality of values; and performing the at least two matrix-vector computations comprises determining a plurality of intermediate results.

3. The method of claim 2, wherein performing, by the video decoder, the multi-pass inverse transformation on the plurality of values comprises performing a second pass of the multi-pass inverse transformation after performing the initial pass of the multi-pass inverse transformation, wherein performing the second pass of the multi-pass inverse transformation comprises:

determining at least two matrices for the second pass;
determining at least two vectors for the second pass based on the plurality of intermediate results; and
performing at least two matrix-vector computations in parallel during the second pass based on the two matrices for the second pass and the two vectors for the second pass.

4. The method of claim 1, wherein the pass comprises a first pass, and wherein performing, by the video decoder, the multi-pass inverse transformation on the plurality of values to derive the residual data that represents the pixel differences between the current block of the video data and the predictive block of the video data comprises:

performing the at least two matrix-vector computations in parallel during the first pass to determine a plurality of intermediate results;
determining at least two matrices for a second pass;
determining at least two vectors for a second pass based on the plurality of intermediate results; and
performing at least two additional matrix-vector computations in parallel during the second pass based on the two matrices for the second pass and the two vectors for the second pass to determine a plurality of values for the residual data.

5. The method of claim 4, wherein the plurality of values for the residual data comprise quantized values.

6. The method of claim 4, wherein the at least two matrices for the first pass have a different dimension than the at least two matrices for the second pass.

7. The method of claim 1, wherein the at least two matrices are defined by a video codec being executed by the video decoder.

8. The method of claim 1, wherein the method of decoding is performed as part of an encoding process, and wherein the video decoder comprises decoding functionality of a video encoder.

9. A device for decoding video data, the device comprising:

a memory for storing video data; and
one or more processors implemented in circuitry and configured to:
determine, based on syntax elements in an encoded video bitstream, a plurality of values for a current block of the video data;
perform a multi-pass inverse transformation on the plurality of values to derive residual data that represents pixel differences between the current block of the video data and a predictive block of the video data, wherein to perform a pass of the multi-pass inverse transformation, the one or more processors:
determine at least two matrices, wherein the at least two matrices comprise a first orthogonal matrix and a second orthogonal matrix;
determine at least two vectors, wherein the at least two vectors comprise a first vector and a second vector; and
perform at least two matrix-vector computations in parallel during the pass, wherein the at least two matrix-vector computations performed in parallel during the pass comprise a first matrix-vector computation using the first orthogonal matrix and the first vector and a second matrix-vector computation using the second orthogonal matrix and the second vector; and
reconstruct the current block of the video data based on the residual data and the predictive block of the video data.

10. The device of claim 9, wherein:

to perform the pass of the multi-pass inverse transformation, the one or more processors are configured to perform an initial pass of the multi-pass inverse transformation;
to determine the at least two vectors, the one or more processors are configured to determine the at least two vectors based on the plurality of values; and
to perform the at least two matrix-vector computations, the one or more processors are configured to determine a plurality of intermediate results.

11. The device of claim 10, wherein to perform the multi-pass inverse transformation on the plurality of values, the one or more processors are configured to perform a second pass of the multi-pass inverse transformation after performing the initial pass of the multi-pass inverse transformation, wherein to perform the second pass of the multi-pass inverse transformation, the one or more processors are configured to:

determine at least two matrices for the second pass;
determine at least two vectors for the second pass based on the plurality of intermediate results; and
perform at least two matrix-vector computations in parallel during the second pass based on the two matrices for the second pass and the two vectors for the second pass.

12. The device of claim 9, wherein the pas comprises a first pass, and wherein to perform the multi-pass inverse transformation on the plurality of values to derive the residual data that represents the pixel differences between the current block of the video data and the predictive block of the video data, the one or more processors are configured to:

perform the at least two matrix-vector computations in parallel during the first pass to determine a plurality of intermediate results;

determine at least two matrices for a second pass;
determine at least two vectors for a second pass based on the plurality of intermediate results; and
perform at least two additional matrix-vector computations in parallel during the second pass based on the two matrices for the second pass and the two vectors for the second pass to determine a plurality of values for the residual data.

13. The device of claim 12, wherein the plurality of values for the residual data comprise quantized values.

14. The device of claim 12, wherein the at least two matrices for the first pass have a different dimension than the at least two matrices for the second pass.

15. The device of claim 9, wherein the at least two matrices are defined by a video codec being executed by the processing circuitry.

16. The device of claim 9, wherein the device is configured to decode the video data as part of a video encoding process.

17. The device of claim 9, wherein the device comprises a wireless communication device, further comprising a receiver configured to receive encoded video data.

18. The device of claim 17, wherein the wireless communication device comprises a telephone handset and wherein the receiver is configured to demodulate, according to a wireless communication standard, a signal comprising the encoded video data.

19. The device of claim 9, further comprising:
a display configured to display decoded video data.

20. A method of encoding video data, the method comprising:
determining, by a video encoder and for a current block of the video data, residual data that represents pixel differences between the current block of the video data and a predictive block of the video data;
performing, by the video encoder, a multi-pass non-separable transformation on the residual data to generate a plurality of values, wherein performing a pass of the multi-pass transformation comprises:
determining at least two matrices, wherein the at least two matrices comprise a first orthogonal matrix and a second orthogonal matrix;
determining at least two vectors, wherein the at least two vectors comprise a first vector and a second vector; and
performing at least two matrix-vector computations in parallel during the pass, wherein the at least two matrix-vector computations performed in parallel during the pass comprise a first matrix-vector computation using the first orthogonal matrix and the first vector and a second matrix-vector computation using the second orthogonal matrix and the second vector;
encoding, by the video encoder and in an encoded video bitstream, syntax elements that represent the plurality of values.

21. A device for encoding video data, the device comprising:
a memory for storing video data; and
one or more processors implemented in circuitry and configured to:
determine, for a current block of the video data, residual data that represents pixel differences between the current block of the video data and a predictive block of the video data;
perform a multi-pass non-separable transformation on the residual data to generate a plurality of values, wherein to perform a pass of the multi-pass transformation, the one or more processors are configured to:
determine at least two matrices, wherein the at least two matrices comprise a first orthogonal matrix and a second orthogonal matrix;
determine at least two vectors, wherein the at least two vectors comprise a first vector and a second vector; and
perform at least two matrix-vector computations in parallel during the pass, wherein the at least two matrix-vector computations performed in parallel during the pass comprise a first matrix-vector computation using the first orthogonal matrix and the first vector and a second matrix-vector computation using the second orthogonal matrix and the second vector;
encode, in an encoded video bitstream, syntax elements that represent the plurality of values.

22. The device of claim 21, wherein the device comprises a wireless communication device comprising a transmitter configured to modulate, according to a wireless communication standard, a signal comprising the encoded video bitstream.

* * * * *